US010848485B2

(12) United States Patent
Cicchitto

(10) Patent No.: US 10,848,485 B2
(45) Date of Patent: Nov. 24, 2020

(54) METHOD AND APPARATUS FOR A SOCIAL NETWORK SCORE SYSTEM COMMUNICABLY CONNECTED TO AN ID-LESS AND PASSWORD-LESS AUTHENTICATION SYSTEM

(71) Applicant: Nelson A. Cicchitto, San Ramon, CA (US)

(72) Inventor: Nelson A. Cicchitto, San Ramon, CA (US)

(73) Assignee: Nelson Cicchitto, Pleasanton, CA (US)

(*) Notice: Subject to any disclaimer, the term of this patent is extended or adjusted under 35 U.S.C. 154(b) by 0 days.

(21) Appl. No.: 15/970,784

(22) Filed: May 3, 2018

(65) Prior Publication Data
US 2018/0255046 A1 Sep. 6, 2018

Related U.S. Application Data

(60) Continuation-in-part of application No. 15/626,997, filed on Jun. 19, 2017, now Pat. No. 9,979,715, which
(Continued)

(51) Int. Cl.
H04L 29/06 (2006.01)
H04L 29/08 (2006.01)
(Continued)

(52) U.S. Cl.
CPC ............ *H04L 63/083* (2013.01); *H04L 67/22* (2013.01); *H04W 4/21* (2018.02); *H04W 4/50* (2018.02); *H04L 63/0815* (2013.01)

(58) Field of Classification Search
CPC ... H04L 63/083; H04L 67/22; H04L 63/0815; H04W 4/21; H04W 4/50
(Continued)

(56) References Cited

U.S. PATENT DOCUMENTS 7,103,666 B2 9/2006 Royer et al.
7,240,364 B1 7/2007 Branscomb et al.
(Continued)

FOREIGN PATENT DOCUMENTS

EP 1089516 A3 8/2002

OTHER PUBLICATIONS

Grassi, Paula., et al., "Digital Identity Guidelines", NIST Special Publication 800-63 Revision 3, Jun. 2017, 1-53.
(Continued)

*Primary Examiner* — Aravind K Moorthy
(74) *Attorney, Agent, or Firm* — Michael A. Glenn; Perkins Coie LLP

(57) ABSTRACT

A technique is provided in which entities, such as companies, connect to a universal social network score server in the cloud, to request therefrom a social network score about an entity. The social network score depicts how many social network sites were visited by the entity, if the entity is visible on the Internet or social network sites, if the entity is active on the social network sites, and, if so, how active. Also described are techniques with which to access a user's web applications, where the user registers and signs on to an aggregator system using any supported login identity provider username and password. The system also automatically creates a system secret username and secret, highly securely generated password, both of which are unknown and inaccessible to the user. The system also maps the login identity provider user name to the secret user name and password for subsequent usage.

19 Claims, 16 Drawing Sheets

Related U.S. Application Data is a division of application No. 15/052,747, filed on Feb. 24, 2016, now Pat. No. 9,686,273.

(60) Provisional application No. 62/120,153, filed on Feb. 24, 2015, provisional application No. 62/501,027, filed on May 3, 2017.

(51) Int. Cl.
*H04W 4/50* (2018.01)
*H04W 4/21* (2018.01)

(58) Field of Classification Search
USPC .................................................. 726/6
See application file for complete search history.

(56) References Cited

U.S. PATENT DOCUMENTS

| | | |
|---|---|---|
| 7,346,923 B2 | 3/2008 | Atkins et al. |
| 7,536,389 B1 | 5/2009 | Prabhakar et al. |
| 8,073,810 B2 | 12/2011 | Maes et al. |
| 8,533,773 B2 | 9/2013 | Maes et al. |
| 8,589,338 B2 | 11/2013 | Maes et al. |
| 9,026,592 B1* | 5/2015 | Marra ................ G06Q 50/01 709/204 |
| 9,065,827 B1* | 6/2015 | Taylor ............... G06F 16/9535 |
| 9,130,910 B1 | 9/2015 | Logue |
| 9,357,022 B1* | 5/2016 | Chou ................. H04L 67/22 |
| 9,363,283 B1 | 6/2016 | Herrera-Yagüe et al. |
| 9,497,312 B1 | 11/2016 | Johansson et al. |
| 9,628,576 B1* | 4/2017 | Agarwal ............ G06Q 10/10 |
| 9,645,789 B1 | 5/2017 | Lee et al. |
| 9,749,305 B1 | 8/2017 | Mehr et al. |
| 9,801,066 B1 | 10/2017 | Hanley et al. |
| 9,807,073 B1 | 10/2017 | Miller |
| 10,032,037 B1 | 7/2018 | Allen |
| 2003/0163738 A1 | 8/2003 | Couillard et al. |
| 2005/0204405 A1 | 9/2005 | Wormington et al. |
| 2005/0238159 A1 | 10/2005 | Halsell et al. |
| 2008/0263632 A1 | 10/2008 | Keon |
| 2008/0289006 A1 | 11/2008 | Hock et al. |
| 2009/0017847 A1 | 1/2009 | Mendiola et al. |
| 2009/0282256 A1 | 11/2009 | Rakic et al. |
| 2009/0292814 A1 | 11/2009 | Ting et al. |
| 2010/0088696 A1 | 4/2010 | Stoev et al. |
| 2011/0125550 A1* | 5/2011 | Erhart ............... G10L 15/005 705/7.29 |
| 2011/0130172 A1 | 6/2011 | Rao |
| 2011/0153740 A1* | 6/2011 | Smith ................ H04L 67/20 709/204 |
| 2011/0197287 A1 | 8/2011 | Hess et al. |
| 2011/0246196 A1 | 10/2011 | Bhaskaran |
| 2012/0047147 A1* | 2/2012 | Redstone ........... H04L 67/18 707/748 |
| 2012/0110072 A1* | 5/2012 | de Villiers ........ G06Q 10/10 709/204 |
| 2012/0215621 A1* | 8/2012 | Heffernan .......... G06Q 30/02 705/14.41 |
| 2012/0226678 A1* | 9/2012 | Park ................... G06Q 10/10 707/709 |
| 2013/0035982 A1* | 2/2013 | Zhang ............... G06Q 30/02 705/7.29 |
| 2013/0036459 A1 | 2/2013 | Liberman et al. |
| 2013/0090084 A1* | 4/2013 | Cherubini ......... G06Q 10/047 455/405 |
| 2013/0122934 A1* | 5/2013 | Branch ............... H04L 67/306 455/456.3 |
| 2013/0124539 A1* | 5/2013 | Lin ................... G06Q 50/01 707/749 |
| 2013/0254283 A1* | 9/2013 | Garcia-Martinez .... G06Q 50/01 709/204 |
| 2013/0263021 A1 | 10/2013 | Dunn et al. |
| 2013/0268994 A1 | 10/2013 | Cooper et al. |
| 2013/0290475 A1 | 10/2013 | Flagg et al. |
| 2013/0314208 A1 | 11/2013 | Risheq et al. |
| 2014/0040020 A1* | 2/2014 | Shanmugam ...... G06Q 30/0246 705/14.45 |
| 2014/0059029 A1* | 2/2014 | Magill ................ G06F 16/955 707/706 |
| 2014/0095874 A1 | 4/2014 | Desai et al. |
| 2014/0123157 A1 | 5/2014 | Keskitalo et al. |
| 2014/0130159 A1* | 5/2014 | Raman ............... G06F 21/554 726/23 |
| 2014/0172837 A1* | 6/2014 | Sommer ............. H04L 67/22 707/722 |
| 2014/0221012 A1 | 8/2014 | Uetabira |
| 2014/0241519 A1 | 8/2014 | Watson et al. |
| 2014/0250499 A1 | 9/2014 | Vercruysse |
| 2014/0258547 A1 | 9/2014 | Scavo et al. |
| 2014/0279038 A1* | 9/2014 | Lombard ........... G06Q 50/01 705/14.66 |
| 2014/0282870 A1* | 9/2014 | Markwordt ........ H04L 63/08 726/3 |
| 2014/0282977 A1* | 9/2014 | Madhu .............. G06F 16/24578 726/7 |
| 2014/0317689 A1 | 10/2014 | Mogush |
| 2014/0330651 A1* | 11/2014 | Klemm ............... G06Q 50/01 705/14.66 |
| 2015/0025980 A1* | 1/2015 | Zaretsky ............ G06Q 30/0275 705/14.71 |
| 2015/0089613 A1 | 3/2015 | Tippett et al. |
| 2015/0095137 A1* | 4/2015 | Savelli .............. G06F 16/24578 705/14.41 |
| 2015/0106924 A1 | 4/2015 | Shahbazi |
| 2015/0113007 A1* | 4/2015 | Hatchard ........... G06Q 10/00 707/754 |
| 2015/0119002 A1 | 4/2015 | Chen et al. |
| 2015/0127678 A1 | 5/2015 | Alvi et al. |
| 2015/0134433 A1* | 5/2015 | Muller .............. G06Q 30/0251 705/14.16 |
| 2015/0149373 A1* | 5/2015 | Chhaya ............. G06Q 30/0282 705/319 |
| 2015/0149529 A1 | 5/2015 | Loader et al. |
| 2015/0195295 A1 | 7/2015 | Sandler et al. |
| 2015/0205794 A1* | 7/2015 | Allen ................. G06T 11/001 707/728 |
| 2015/0245204 A1 | 8/2015 | Heydon |
| 2015/0261756 A1* | 9/2015 | Klemm ............. G06F 16/24578 707/723 |
| 2015/0264084 A1* | 9/2015 | Kashyap ........... H04L 63/1483 726/22 |
| 2015/0302302 A1* | 10/2015 | Kim .................. G06Q 50/01 706/46 |
| 2015/0304330 A1 | 10/2015 | Soamboonsrup et al. |
| 2015/0332067 A1* | 11/2015 | Gorod ............... G06F 16/9535 726/26 |
| 2016/0012194 A1* | 1/2016 | Prakash ............. G16H 50/20 705/2 |
| 2016/0019546 A1 | 1/2016 | Eisen |
| 2016/0028688 A1 | 1/2016 | Chizhov et al. |
| 2016/0048662 A1 | 2/2016 | Arnoud et al. |
| 2016/0070704 A1* | 3/2016 | Yu .................... G06F 16/24578 707/723 |
| 2016/0110083 A1* | 4/2016 | Kranendonk ...... H04L 51/32 715/753 |
| 2016/0112397 A1 | 4/2016 | Mankovskii |
| 2016/0117328 A1* | 4/2016 | Mondal ............. G06F 16/95 707/725 |
| 2016/0117355 A1* | 4/2016 | Krishnamurthy ..... G06F 16/23 707/749 |
| 2016/0132904 A1* | 5/2016 | Mondal ............. G06Q 50/01 705/7.29 |
| 2016/0134599 A1 | 5/2016 | Ross et al. |
| 2016/0155089 A1 | 6/2016 | Nakashima et al. |
| 2016/0164922 A1* | 6/2016 | Boss ................. G06Q 50/01 726/1 |
| 2016/0171513 A1 | 6/2016 | Takeda et al. |
| 2016/0173500 A1 | 6/2016 | Sharabi et al. |
| 2016/0182556 A1* | 6/2016 | Tatourian .......... H04L 67/02 726/25 |
| 2016/0217489 A1* | 7/2016 | Allard ............... G06F 16/24578 |

(56) References Cited

U.S. PATENT DOCUMENTS

| | | | |
|---|---|---|---|
| 2016/0239573 A1* | 8/2016 | Albert | G06F 40/30 |
| 2016/0285633 A1 | 9/2016 | Allinson et al. | |
| 2016/0328216 A1 | 11/2016 | Leonelli et al. | |
| 2016/0350309 A1* | 12/2016 | Chatterjee | H04L 67/22 |
| 2016/0381227 A1* | 12/2016 | Singh | H04M 3/56 |
| | | | 379/202.01 |
| 2017/0039476 A1* | 2/2017 | Eyring | G06Q 10/1093 |
| 2017/0053280 A1* | 2/2017 | Lishok | G06Q 20/3224 |
| 2017/0064020 A1* | 3/2017 | Obukhov | H04L 67/306 |
| 2017/0076293 A1 | 3/2017 | Cage et al. | |
| 2017/0091289 A1* | 3/2017 | Ohazulike | G06Q 50/01 |
| 2017/0093829 A1 | 3/2017 | Gitlin et al. | |
| 2017/0099358 A1* | 4/2017 | Perez | G06Q 10/0639 |
| 2017/0132203 A1 | 5/2017 | Kim et al. | |
| 2017/0140643 A1 | 5/2017 | Puppo | |
| 2017/0142035 A1* | 5/2017 | Bradley | H04W 4/21 |
| 2017/0154359 A1* | 6/2017 | Zukerman | G06Q 30/0252 |
| 2017/0161272 A1* | 6/2017 | Tada | G06F 16/248 |
| 2017/0201520 A1 | 7/2017 | Chandoor et al. | |
| 2017/0221156 A1* | 8/2017 | Mingarelli | G06Q 50/01 |
| 2017/0277691 A1* | 9/2017 | Agarwal | H04W 4/21 |
| 2017/0300946 A1* | 10/2017 | Wilkinson | G06Q 50/01 |
| 2017/0318007 A1 | 11/2017 | Cleeve | |
| 2017/0339631 A1 | 11/2017 | Pugaczewski et al. | |
| 2017/0374090 A1 | 12/2017 | McGrew et al. | |
| 2018/0032722 A1 | 2/2018 | Carlson et al. | |
| 2018/0054467 A1* | 2/2018 | Abou Mahmoud | |
| | | | G06Q 30/0256 |
| 2018/0089318 A1* | 3/2018 | Chatterjee | H04L 67/10 |
| 2018/0110475 A1 | 4/2018 | Shaya | |
| 2018/0114216 A1* | 4/2018 | Joseph | G06N 3/08 |
| 2018/0130002 A1 | 5/2018 | Dekoekkoek et al. | |
| 2018/0158061 A1 | 6/2018 | Edelstein et al. | |
| 2018/0158100 A1* | 6/2018 | Barak | H04W 4/21 |
| 2018/0196813 A1* | 7/2018 | Lin | G06Q 50/01 |
| 2018/0204260 A1 | 7/2018 | McGregor et al. | |
| 2018/0218356 A1 | 8/2018 | Grassadonia et al. | |
| 2018/0232641 A1* | 8/2018 | Bostick | G06N 5/04 |
| 2018/0262471 A1 | 9/2018 | Pereira et al. | |
| 2018/0287883 A1 | 10/2018 | Joshi et al. | |
| 2018/0295146 A1* | 10/2018 | Kovega | H04L 63/1416 |
| 2018/0324126 A1* | 11/2018 | Grant | H04L 51/12 |
| 2018/0337932 A1 | 11/2018 | Juster et al. | |
| 2019/0034976 A1* | 1/2019 | Hamedi | G06Q 30/0271 |
| 2019/0042656 A1* | 2/2019 | Germishuys | G06F 16/9535 |
| 2019/0052722 A1 | 2/2019 | Gasking | |
| 2019/0087746 A1 | 3/2019 | Jain et al. | |
| 2019/0102459 A1* | 4/2019 | Patterson | G06F 16/951 |
| 2019/0108209 A1* | 4/2019 | Ahuja | G06N 20/00 |
| 2019/0109842 A1 | 4/2019 | Kumar et al. | |
| 2019/0124023 A1* | 4/2019 | Conroy | G06N 20/20 |
| 2019/0245871 A1 | 8/2019 | Ward et al. | |

OTHER PUBLICATIONS

Grassi, Paula., et al., "Digital Identity Guidelines", NIST Special Publication 800-63A, Jun. 2017, 1-32.

Grassi, Paula., et al., "Digital Identity Guidelines", NIST Special Publication 800-63C, Jun. 2017, 1-34.

Grassi, Paula., et al., "Digital Identity Guidelines", NIST Special Publication 800-63B, Jun. 2017, 1-55.

* cited by examiner

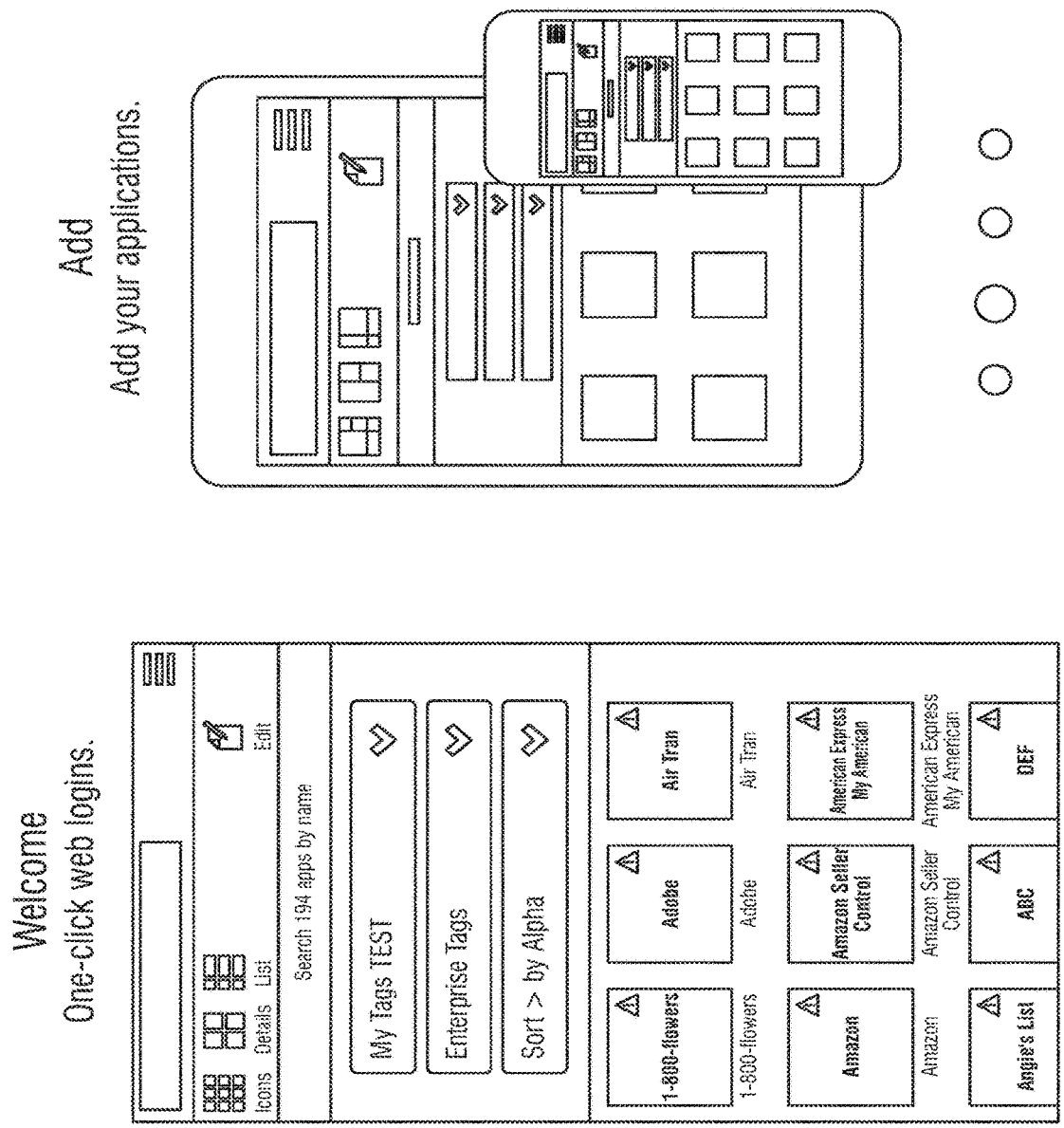

METHOD AND APPARATUS FOR A SOCIAL NETWORK SCORE SYSTEM COMMUNICABLY CONNECTED TO AN ID-LESS AND PASSWORD-LESS AUTHENTICATION SYSTEM

CROSS REFERENCE TO RELATED APPLICATIONS

This patent application is a continuation-in-part of U.S. patent application Ser. No. 15/626,997, AGGREGATOR TECHNOLOGY WITHOUT USERNAMES AND PASSWORDS, filed Jun. 19, 2017, which is incorporated herein by reference in its entirety, which is a divisional of U.S. patent application Ser. No. 15/052,747 (now U.S. Pat. No. 9,686,273), AGGREGATOR TECHNOLOGY WITHOUT USERNAMES AND PASSWORDS, filed Feb. 24, 2016, which is incorporated herein by reference in its entirety, and additionally claims priority from U.S. Provisional Patent Application No. 62/120,153, SOCIAL SINGLE SIGN-ON AGGREGATOR WITHOUT USERNAMES AND PASSWORDS, filed Feb. 24, 2015, which is also incorporated herein by this reference in its entirety, and this patent application claims priority from U.S. Provisional Patent Application No. 62/501,027, MOBILE DEVICE ENABLED DESKTOP TETHERED AND TETHERLESS AUTHENTICATION AND METHOD AND APPARATUS FOR A SOCIAL NETWORK SCORE AND IDENTITY ASSURANCE SCORE TIES TO ID-LESS AND PASSWORD-LESS AUTHENTICATION SYSTEM, filed May 3, 2017, which is incorporated herein by reference in its entirety.

BACKGROUND OF THE INVENTION

Technical Field

This invention relates generally to the field of Internet technology. More specifically, this invention relates to gathering data from the Internet, computing therefrom various metrics, and transmitting such metrics to requesting entities.

Description of the Related Art

Presently, an individual has a particular presence on the Internet, such as for example, on social media or networking websites. For example, an employee may spend many hours on a social media website when the employee should be working. As another example, another employee working in research may not be using the social media networking sites or tools as much as he or she could.

A system and method for measuring contributor weight or influence in social media is taught in U.S. Pat. No. 9,442,984, SOCIAL MEDIA CONTRIBUTOR WEIGHT (Sep. 13, 2016) to K. G. Smith and W. B. George. However, these metrics are limited to being based on downstream content.

As well, many organizations rely on technological identity and access management solutions to keep pace with the growth of their organizations, e.g. gaming and hospitality enterprises. Thus, for example, such organizations deploy automated user de-provisioning or password policy enforcement.

In today's environment, partner enterprises allow an external user from one organization outside of their network to have access to an internal application of their organization within their own network. This type of partnership can be referred to as federated identity management. With using federated identity management, an internal application written at Company A can be made publicly available. For a user at Company B on one type of network to access on an entirely different network the internal application written at Company A, the user has to perform the following procedure. The user creates an internal ID at Company A, enters the internal application and maps his external ID from his own network to his internal ID on Company A's network. Further, Company A can allow the user to access their internal application by the user using a social network account, such as a LinkedIn (Mountain View, Calif.; "LinkedIn") account for example. Then, Company A can link the external user's social network account sign on to Company A's internal application.

The technique described above allows Company A to manage their partners' access to their internal applications. Today, there's a technology known as federation, which allows an enterprise to manage their partners' access to their internal applications. However, federation requires high maintenance for every partner company and a lot of initial effort to set up and configure.

SUMMARY OF THE INVENTION

A technique is provided in which entities, such as companies, connect to a universal social network score server in the cloud, to request therefrom a social network score about an entity, such as an individual. The social network score can depict how many social network sites were visited by the entity, if the entity is visible on the Internet or social network sites, if the entity is active on the social network sites, and, if so, how active.

BRIEF DESCRIPTION OF THE DRAWINGS

One or more embodiments of the present invention are illustrated by way of example and not limitation in the figures of the accompanying drawings.

FIG. 1 illustrates an example of an interface of a user's page of an aggregator platform, according to an embodiment;

FIG. 9 illustrates an example of a user interface of a delegation page in which a user can enter a delegation type, provider type, provider user name, applicable filters, and a selection of one or more applications to share, according to an embodiment;

FIG. 10 illustrates an example of a user interface showing a sample dropdown list of the provider types of FIG. 9, according to an embodiment;

FIG. 11 illustrates an example of a user interface showing a home page of the aggregator system, according to an embodiment;

FIG. 12 illustrates an example of two different devices, a tablet and a smartphone, each displaying the home page web page of the aggregator system, according to an embodiment;

DETAILED DESCRIPTION

Figure 2:
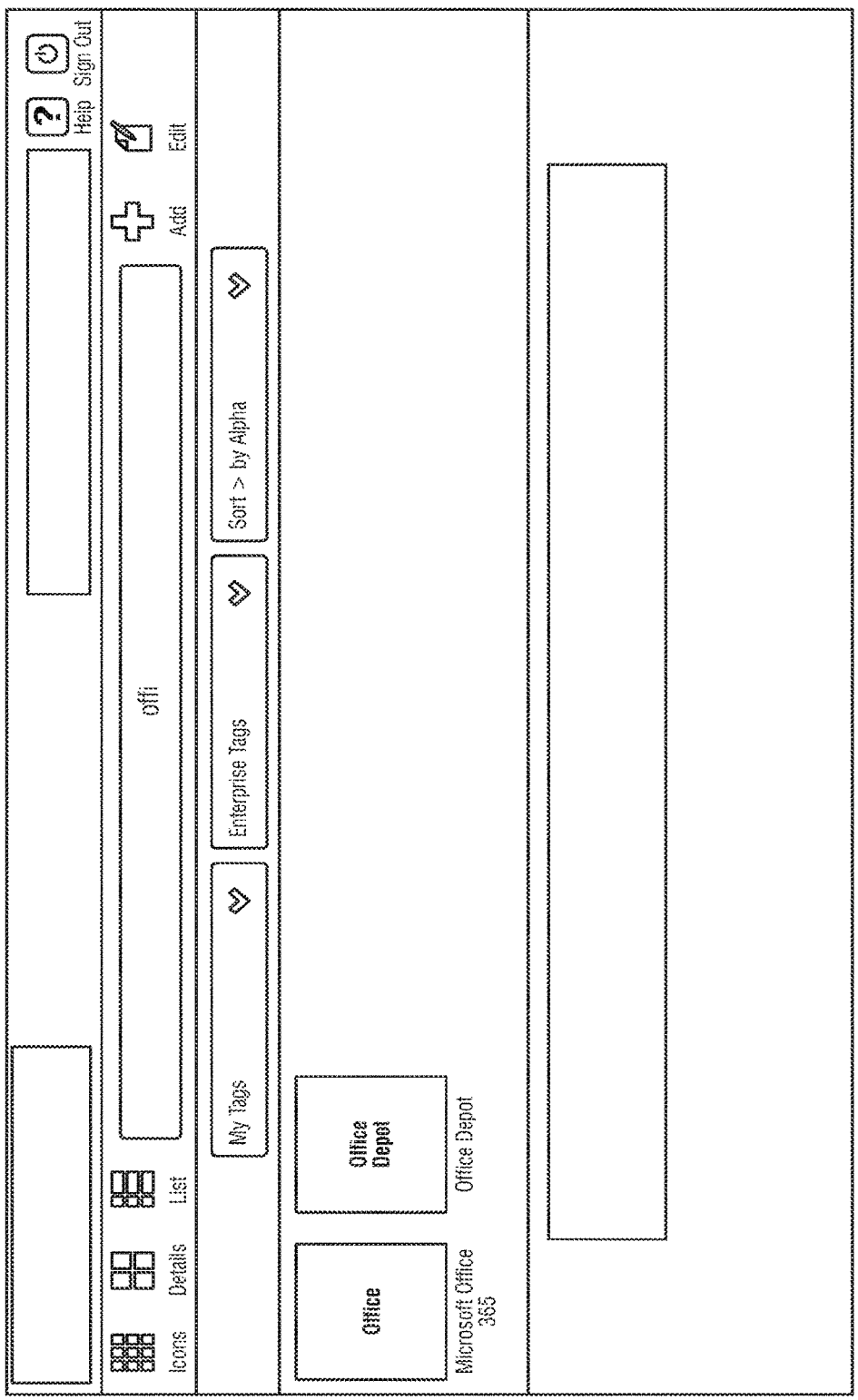
FIG. 2 illustrates an example of a user interface showing two icons representing an enabled application on the aggregator platform and a not-enabled application on the aggregator platform, according to an embodiment.

A technique is provided in which entities, such as companies, connect to a universal social network score server in the cloud, to request therefrom a social network score about an entity, such as an individual. The social network score can depict how many social network sites were visited by the entity, if the entity is visible on the Internet or social network sites, if the entity is active on the social network sites, and, if so, how active.

Also introduced here is a technique with which to access a user's web applications. The user registers and signs on to an aggregator system using any supported login identity provider username and password. When the user registers for the first time, the system collects additional information to verify the user for a subsequent access to the system. The system also automatically creates a system secret username and secret, highly securely generated password, both of which are unknown and inaccessible to the user. The secret username and password are stored in a lightweight directory access protocol (LDAP) server or database or in a distributed cloud database system. The system also maps the login identity provider user name to the secret user name and password for subsequent usage.

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

An Exemplary Embodiment of an Aggregator Platform Without Usernames and Passwords An exemplary embodiment of an aggregator platform without usernames and passwords is a social single sign-on ("sSSO") platform. It should be appreciated that the technique discussed herein can also refer to the aggregator system or application, depending on the context of the discussion. Such platform comprises a server that aggregates a plurality of web applications both internal to an organization and that are public facing to login identity providers including social networking sites such as for example LinkedIn or Facebook (Menlo Park, Calif.; "Facebook"). The platform presents the aggregation of such web applications as links provided to a particular user.

Examples of login identity providers include but are not limited to social networking sites, Linkedin and Facebook. A sample non-exhaustive list can be found in FIG. 4, which is described in further detail below.

Figure 1:
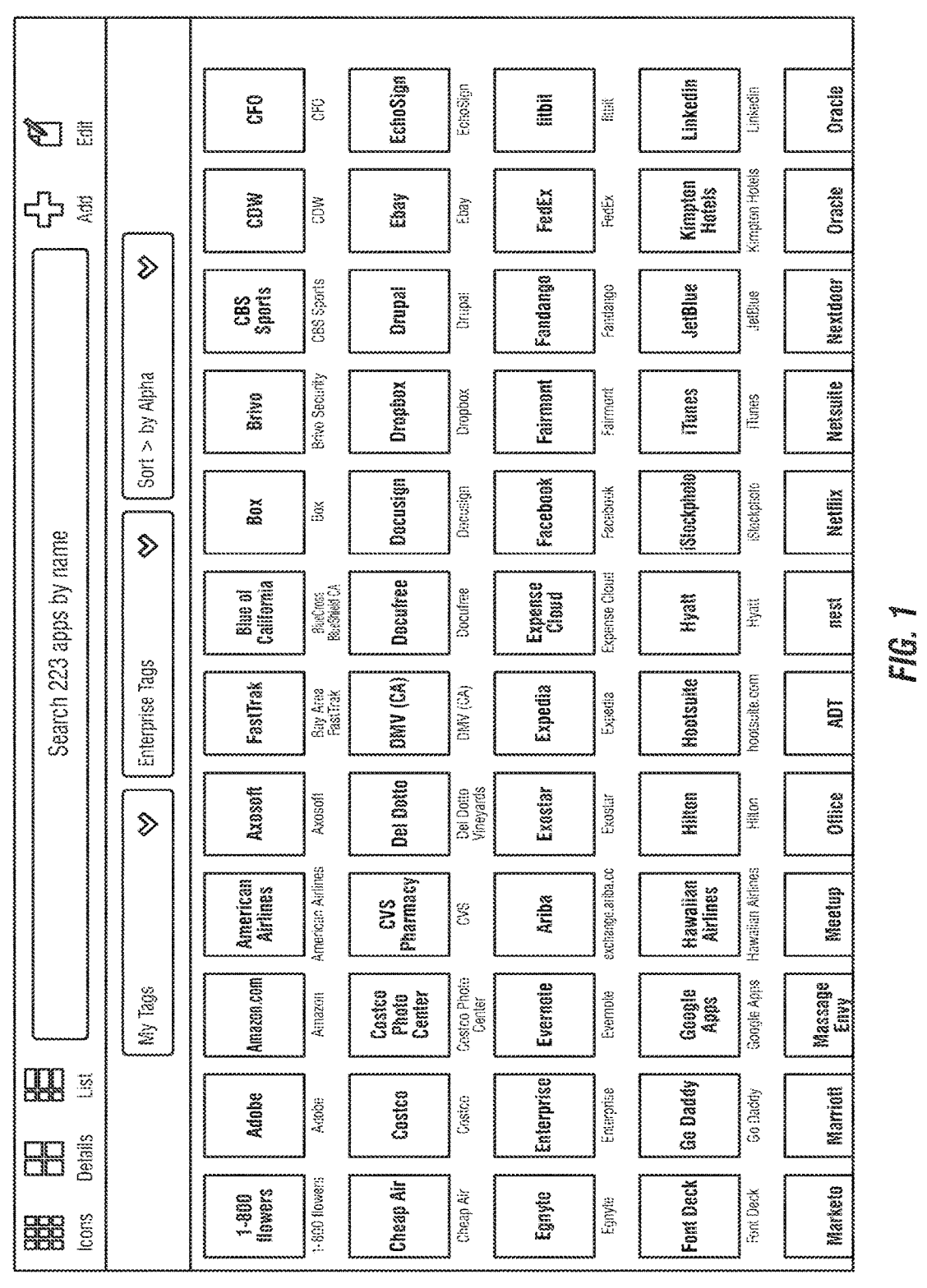

Non-exhaustive examples of web applications that can be aggregated by the server can be found in FIG. 1. FIG. 1 is a sample innovative interface of a user's page on a sSSO application, which displays a collection of web applications which the user had previously added to his sSSO application.

It should be appreciated that the aggregator platform is not limited to the social single sign-on environment. The techniques introduced herein are applicable to aggregators that allow end users to add an application, such that to link to the application at any future time, and from any device, would not need to reenter an ID and/or password. However, employing the social single sign-on implementation of the technique as discussion herein is for purposes of understanding the innovation herein and not for limiting purposes.

To access any of the user's web applications, the user registers and signs on to a social sign-on system ("sSSO") using any supported login identity provider user name and password. For example, the user can register to sSSO using his user name and password that he uses for his Linkedin account. If the user is registering for the first time, the sSSO collects additional information to verify the user later such as for a subsequent access to sSSO. For example, sSSO can collect but is not limited to collecting the user's mobile phone number, questions and answers related to information unique to the user, pictures, biometric data, and/or social information from the identity providers, such as for example information regarding friends, pictures, dates, and conversations. sSSO also automatically creates an sSSO secret user name and a sSSO secret, highly securely generated password. Both such secret user name and secret password are unknown and inaccessible to the user. In an embodiment, this secret user name and secret password are stored in a lightweight directory access protocol (LDAP) server or database or in a distributed cloud database system, etc. sSSO also maps or links the login identity provider user name to the secret user name and password of sSSO system for subsequent usage.

After the user has registered, the user can start using signal sign-on to login automatically to web applications available to the sSSO system. The login identity provider is mapped to the sSSO secret internal user name for purposes of displaying the configured SSO enabled web applications to the appropriate sSSO logged in user. In short, the sSSO secret internal user name is used to display the right apps (web applications) to the right user. Thus, for example, when the user obtains a new, upgraded smartphone, the user does not need to download and reenter the user ID and password for each of his web applications. The user can access any and all of his applications registered in the sSSO from the sSSO application.

FIG. 2 is a sample user interface showing icons representing an enabled and a not enabled SSO application. In this example, the leftmost icon, e.g. Office, represents an SSO enabled application while the icon to the right represents a web application, e.g. Office Depot, that is not enabled. In this example, the sSSO application is configured to display a visual indicator, such as the triangle with the exclamation sign inside, to indicate that such web application is not sSSO enabled.

Figure 3:
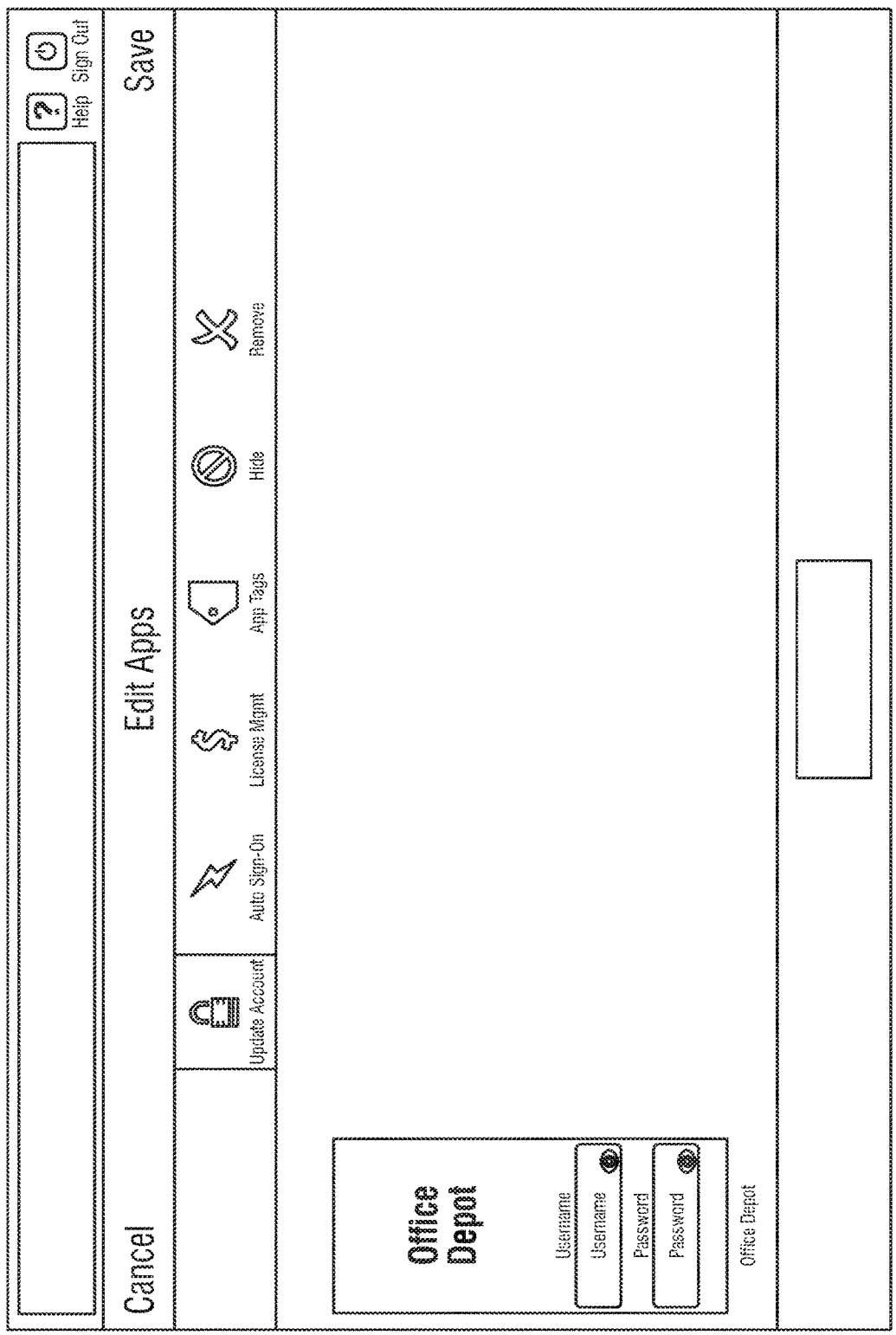
FIG. 3 illustrates an example of a user interface showing a log in graphical user interface (GUI) for a user to add and configure an organization to his aggregator platform, according to an embodiment.

In an embodiment, to enable a web application for sSSO requires entering a user name and optionally a password. An example implementation can be found in FIG. 3. FIG. 3 is a sample user interface of a registration screen to register a particular web application. In the registration screen, a user can enter his or her user name and optionally his or her password for the particular web application.

If the SSO web application, e.g. Office Depot in FIG. 3, is also a login identity provider then sSSO automatically maps or otherwise links the new login identity provider to the sSSO internal secret user name, which enables that login identity provider, e.g. Office Depot, to be used for login in purposes in addition to the existing registered login identity provider, e.g. the original sSSO system. As another example, Facebook and LinkedIn could both be login identity providers to the sSSO system assuming the LinkedIn web application was enabled for single sign-on.

If the sSSO user decides to login using a new unregistered login identity provider, e.g. Facebook, and the user never enabled that login identity provider web application for SSO, the sSSO system will attempt to identify the end user. For example, the sSSO system can go to and use a stored list of usernames and related metadata such as email addresses, actual names, etc., and display candidate selections, e.g. a list of users with similar names from the registered login identity providers, e.g. FACEBOOK: Julie@yahoo.com. That is, the sSSO system prompts the user to pick the login identity provider user name that they recognize. The login identity provider user name can be received by other input means such as for example the user entering his or her user name in a text box, audibly providing the user name, selecting an image that is recognized by the user, providing biometric data such as a finger print, and so on. In addition to using the received user input, the sSSO verifies the identity of the sSSO user by using additional registration information, that is information which was provided by the user when the user registered. For example, such additional registration information can include but is not limited to SMS, Questions/Answers, already registered login identity provider information, biometric information, etc.

Figure 4:
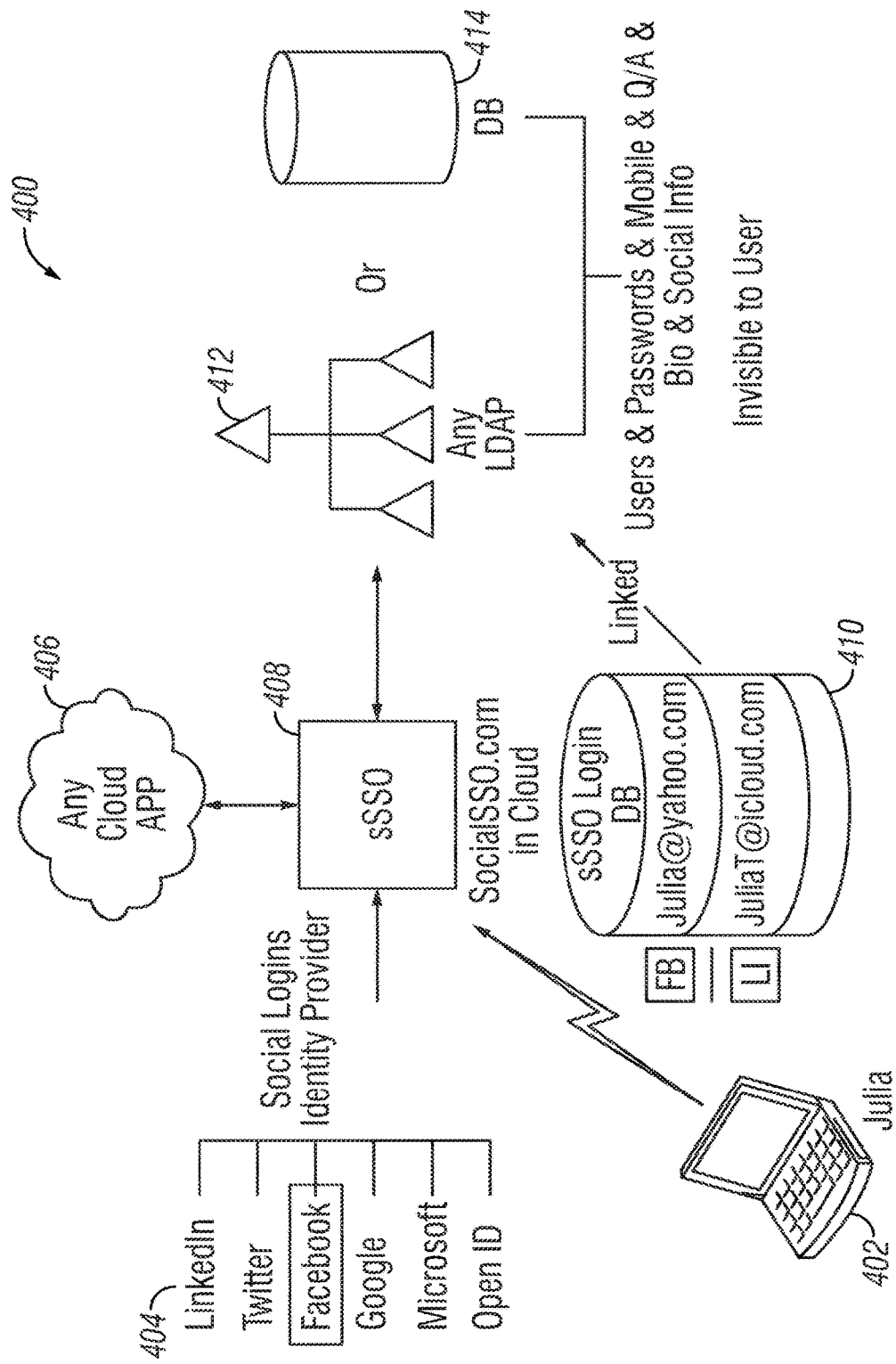
FIG. 4 is a schematic diagram of a system architecture for the aggregator platform, according to an embodiment.

An Exemplary Embodiment of Social Single Sign-On Without Username or Password from a Single Sign-On Provider An embodiment can be understood with reference to FIG. 4. FIG. 4 is a schematic diagram of a system architecture for an aggregator platform, such as for example sSSO, without username or password from the provider, such as for example a SSO provider, 400. A user 402 logs into a social single sign-on (sSSO) application 408, e.g. such as at a website, SocialSSO.com for example, in a network environment such as in a cloud environment. A plurality of social login identity providers 404 are communicably connected with sSSO 408 such that for example a user can log onto sSSO 408 through any of these connected social logins identity providers 404. sSSO 408 is communicably connected to a repository, sSSO login database (DB) 410. In this illustrative example, repository 410 is storing two usernames associated with user 402: Julia@yahoo.com associated with her Facebook account and JuliaT@icloud.com associated with her Linkedin account. sSSO 408 is communicably connected to web applications in the cloud 406. When the user registered with sSSO 408, sSSO 408 requested additional data from the user that could be used in identifying the user at subsequent points in time. Types of such data include but are not limited to user data, passwords, mobile data, questions and answers, biometric data, and social data. sSSO 408 stores such data in a second repository 414 via a distributed directory information service over an Internet Protocol (IP) network 412 such as for example a Lightweight Directory Access Protocol (LDAP) system 412. These user names and other data stored in repository 414 and accessible via service 412 are invisible and inaccessible to the users. Thus, user 402 can login to sSSO 408 using any of her existing social usernames (as shown in repository 410) associated with the respective social login identity provider, which is linked to the user's secret data stored in repository 414. Then, after making the link, sSSO proceeds to verify the user by using any of such data in repository 414, such as for example, asking for a cell phone number or a asking a question and expecting a specific answer that matches a stored answer.

Social Federation Social Single Sign-On

Social Federation social single sign-on ("sFed") can be a system, API, or service that enables an organization such as a company, a university, or a government agency, etc. or end user to easily and securely enable an external party such as a contractor, vendor, alumni, family, friends, etc. access to internal (private) and external (public) web applications without using traditional federation technologies or manually requiring setting up a new user name and password. sFed combined with sSSO easily and securely shares web site login-related data with any user who already has a username and password on a login identity provider website.

Figure 5A:
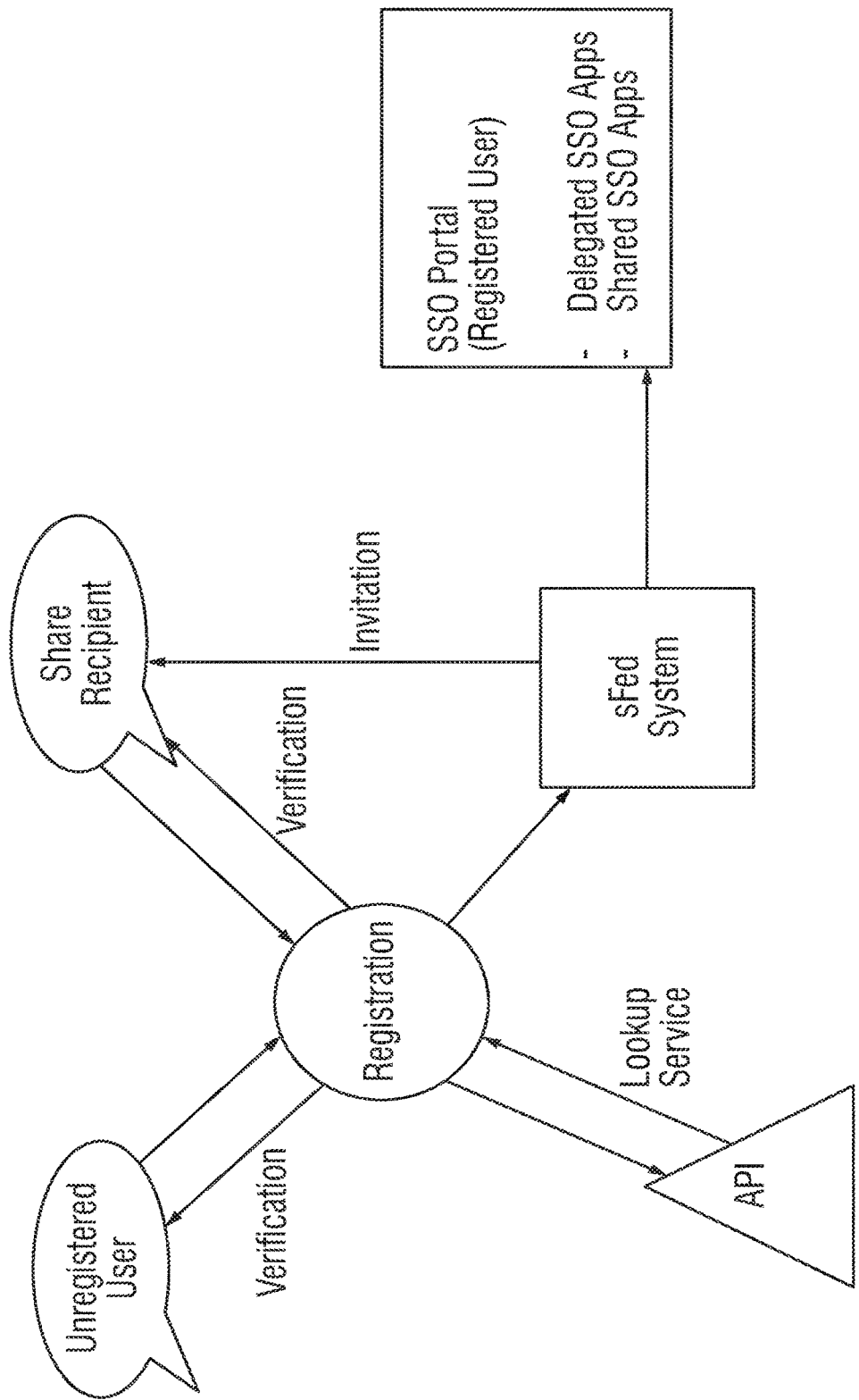
FIG. 5A is a flow diagram of a process for registration to a social federation system, according to an embodiment.

An embodiment of the invention can be understood with reference to FIG. 5A. FIG. 5A is a flow diagram of a process for registration to a social federation system. To use the sFed system requires an external party to register in sSSO or any registered sSSO user to invite an unregistered sSSO user. After they have been registered, the sFed system detects sSSO registration and registered login identity provider user name. Using the sFed system, API, or service, the organization sFed administrator or a sSSO user can delegate (share) sSSO enabled web applications to a registered user or invite an unregistered sSSO user which automatically registers the user into the sSSO system by requiring the invited user to login once to the sSSO system using a login identity provider user name. For example, FACEBOOK: Julie@yahoo.com registers on sSSO and sFed verifies her identity by sending her a SMS token, or question associated with an expected (Q/A), or requiring a biometric confirmation. Thus, in an embodiment, requiring a user to remember and enter login informational data is not needed. sSSO is configured to transmit an alert to the user, where the user can respond with identifying-related data as discussed above.

Figure 5B:
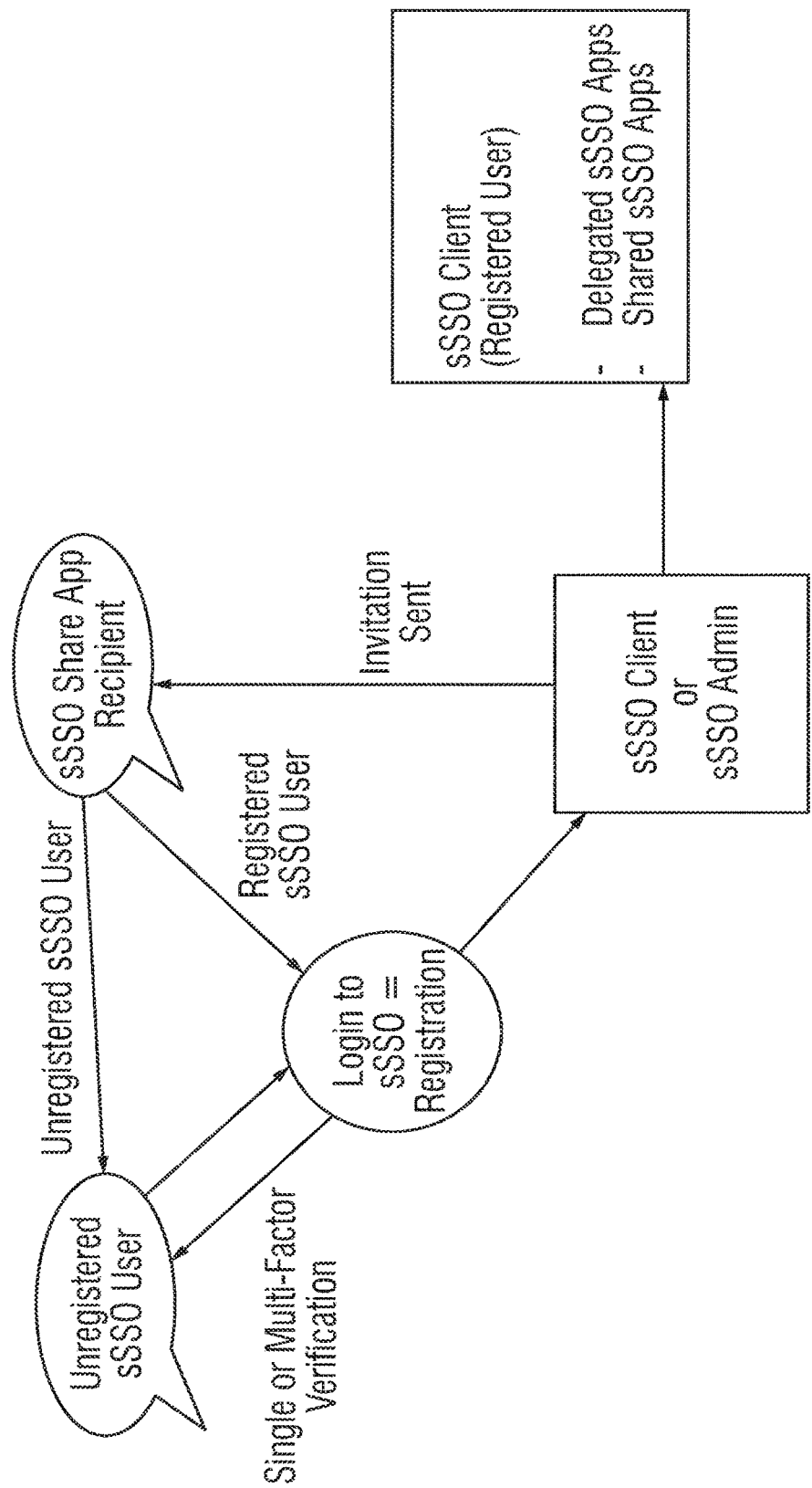
FIG. 5B is a flow diagram of a process for registration to an aggregator system, according to an embodiment.

An embodiment of the invention can be understood with reference to FIG. 5B. FIG. 5B is a process flow for registration to the sSSO system. A user such as an sSSO Client or sSSO Administrator sends an invitation to a recipient, e.g. sSSO Share App Recipient, for the purposes of sharing or delegating an application. If the sSSO recipient is already registered with sSSO, e.g. is a Registered sSSO User, then when such sSSO recipient logs in to sSSO and accepts the invitation, the delegated application is added by the sSSO system to the recipient's collection of sSSO applications. If the sSSO recipient is not yet registered with sSSO, then with the invitation, such recipient is provided the opportunity to register with the sSSO system by providing single or multi-factor verification data. Subsequently, the recipient is a registered sSSO user and the application is added to such user's collection of sSSO applications.

In an embodiment, sSSO enables a user to share login capability along with sharing an application.

Figure 6:
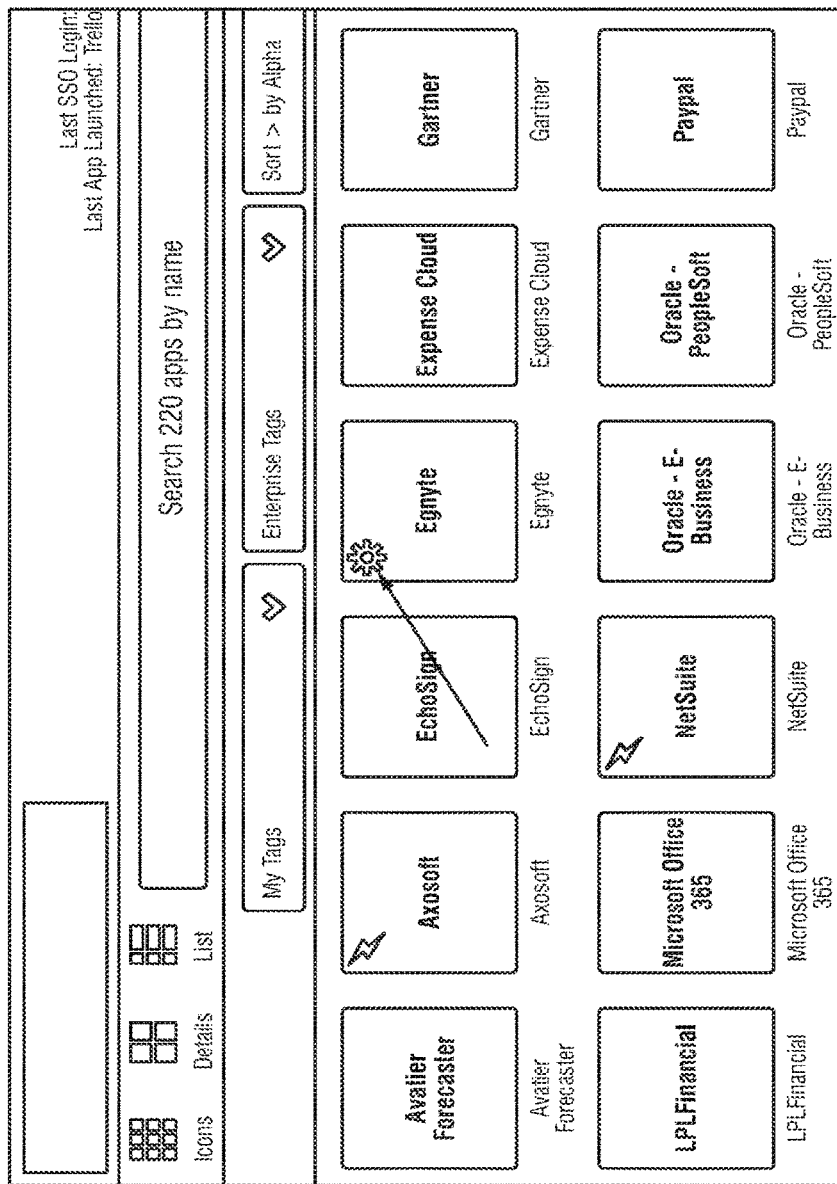
FIG. 6 illustrates an example of a user interface showing an SSO user sharing an application with an unregistered or registered SSO user, according to an embodiment.

FIG. 6 is a sample user interface showing an SSO user sharing an application with an unregistered or registered SSO user. The user initiates the process for the selected SSO application, e.g. Egnyte, by clicking on the icon.

Figure 7:
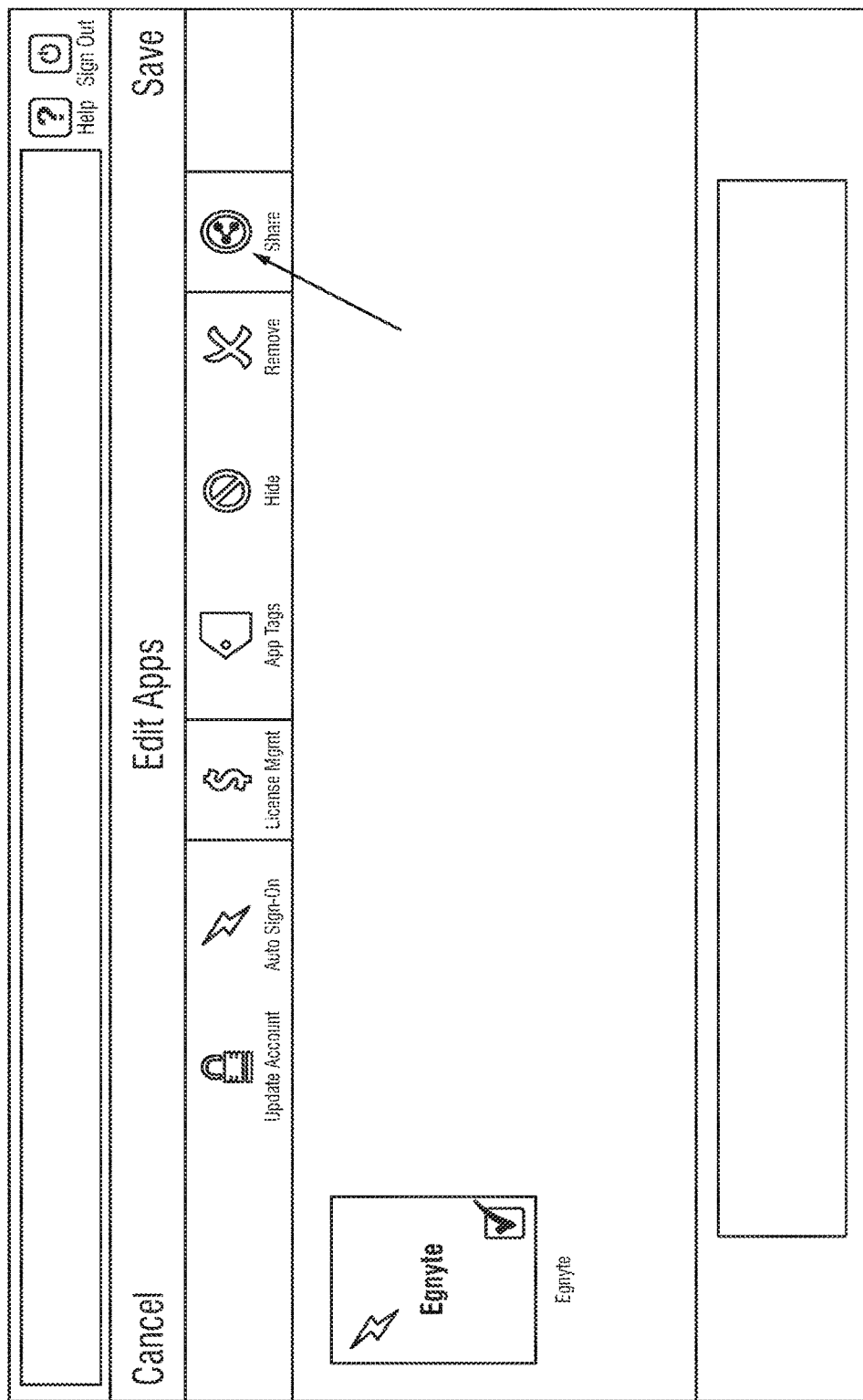
FIG. 7 illustrates an example of a user interface showing a user has selected a Share command to send to a recipient user.

FIG. 7 is a sample user interface showing a user has selected a share command to send to a recipient user. The share command can be sent via multiple methods including but not limited to email, SMS, social network, copying, etc.

Figure 8:
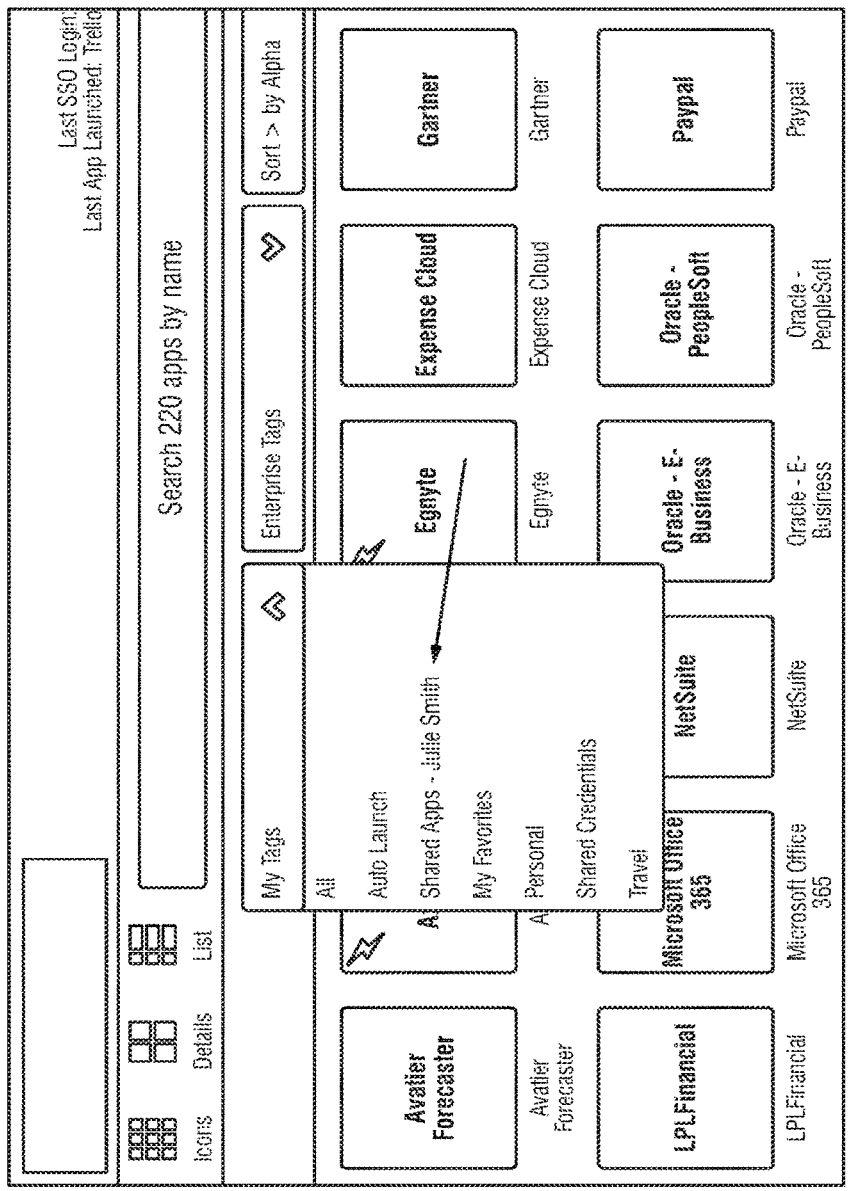
FIG. 8 illustrates an example of a user interface showing how after the SSO user proceeds with registration or log in to SSO, the system provides the user the capability of seeing his shared SSO applications, according to an embodiment.

FIG. 8 is a sample user interface showing how after the SSO user proceeds with registration or login to SSO, they subsequently have capability of seeing or accessing shared SSO applications. For example, the user can access the shared applications by selecting a drop menu that contains a link to a shared apps page. In this example, the system provides a link to shared applications for each recipient.

Figure 9:
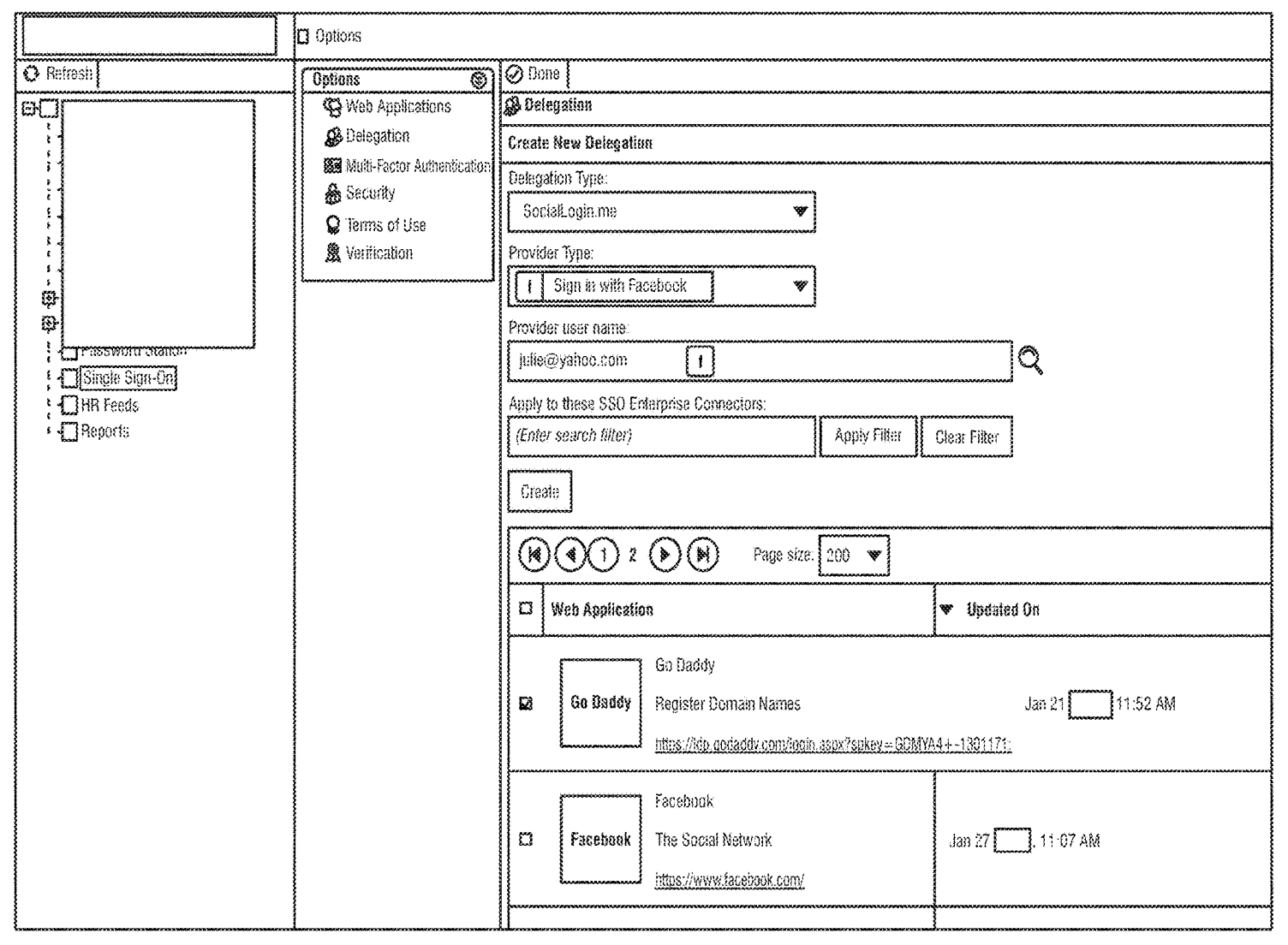

An embodiment provides a sSSO delegation administrator model and corresponding functionality. An administrator can delegate a particular sSSO user to a particular sSSO application, as shown in FIG. 9 for example. FIG. 9 is a sample user interface of a delegation page in which a user can enter a delegation type, e.g. SocialLogin.me, provider type, e.g. Sign in with Facebook, a provider user name, e.g. Julie@yahoo.com, applicable filters, and a selection of one or more applications to share, e.g. Go Daddy.

Figure 10:
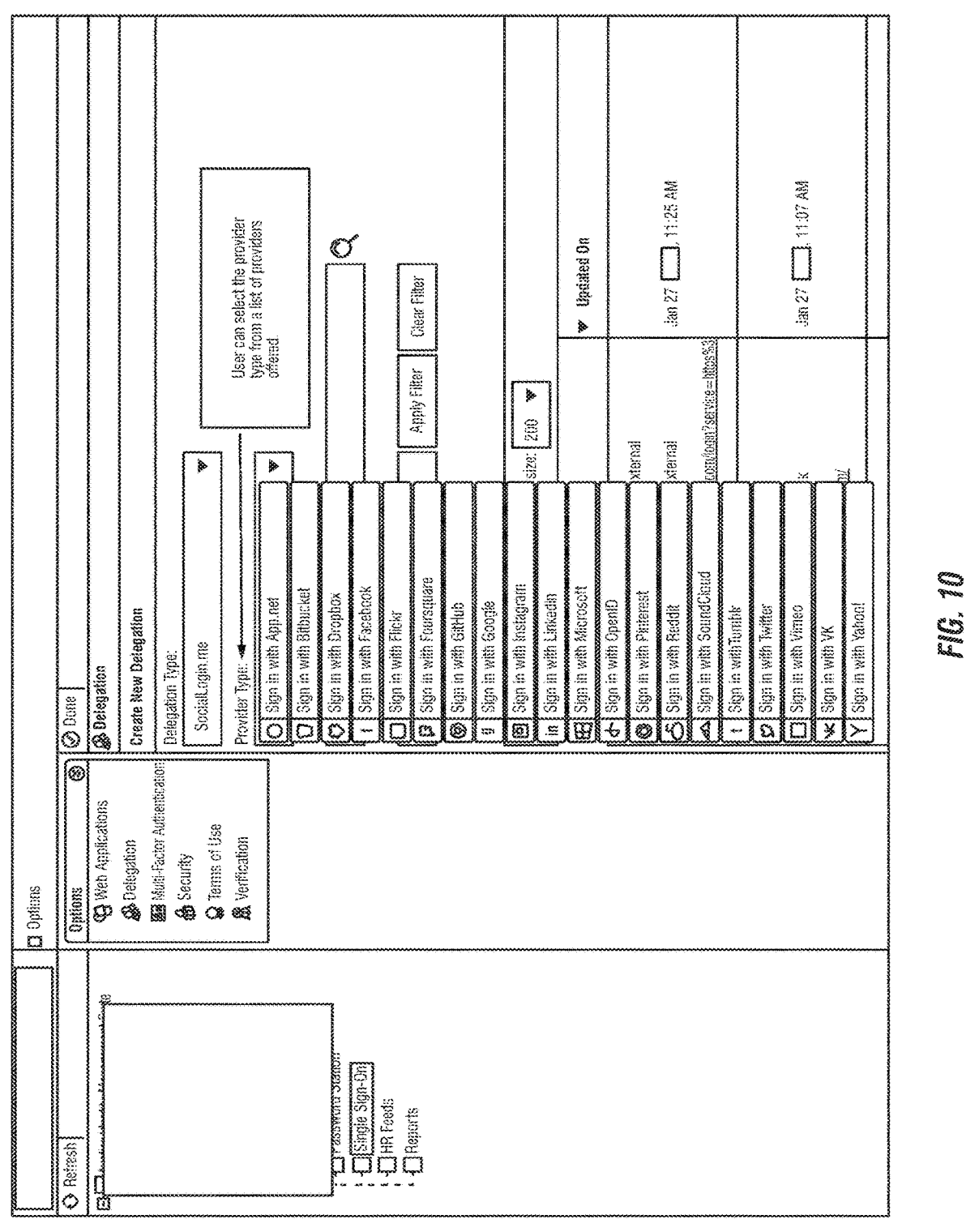

FIG. 10 is a sample user interface showing a non-exhaustive sample dropdown list of the provider types of FIG. 9, each selected type enabling the user to sign in to sSSO and/or sSSO's various enabled web applications or sSSO enterprise connected applications.

If the sFed administrator or sSSO end user is delegating (sharing) a SSO enabled web application, that is using a fixed username and password or a known user name and password to multiple people or shared within the organization to the sSSO user, then system is configured to cause the shared web application to automatically appear on the sSSO users' sSSO interface. For example, sFed uses an API or direct database calls to add the new SSO enabled web application to the user's sSSO interface.

If the sFed administrator is delegating a SSO enabled web application that is using a username and password that is unique to the sSSO user, then sFed automatically creates a user name and password on the enabled web application. For example sFed can use a format for exchanging authentication and authorization data between parties such as between an identity provider and a service provider, e.g. Security Assertion Markup Language (SAML). Or sFed can use internal methods. Then the SSO enabled web application automatically appears enabled on the sSSO user's sSSO interface.

Web Crawler for Applications Requiring Logons

A technique is introduced by which a web crawler system crawls for web applications that require logons, regardless of content. Each identified web application is added to a database, such as for example the sSSO databases 410 or 414, of such type of applications. In accordance to one technique, the web crawler system discovers a web application and then attempts to logon to the application with a bogus ID and a bogus password. If the attempt is unsuccessful, the web crawler system creates a definition for the web application, where the definition defines attributes of the web application. The web crawler system uses these attributes to categorize the web application within the database. Based on matching the categorization and user profiles, the web crawler system offers the web application to a particular user to add the web application to the user's aggregation of web applications. For instance, the web crawler system can display or send a message to the particular user indicating, "You like bicycles. Perhaps you'd like to add this bicycle application ('bikeapp.com') to your aggregated applications."

Alternate Embodiments

Figure 14:
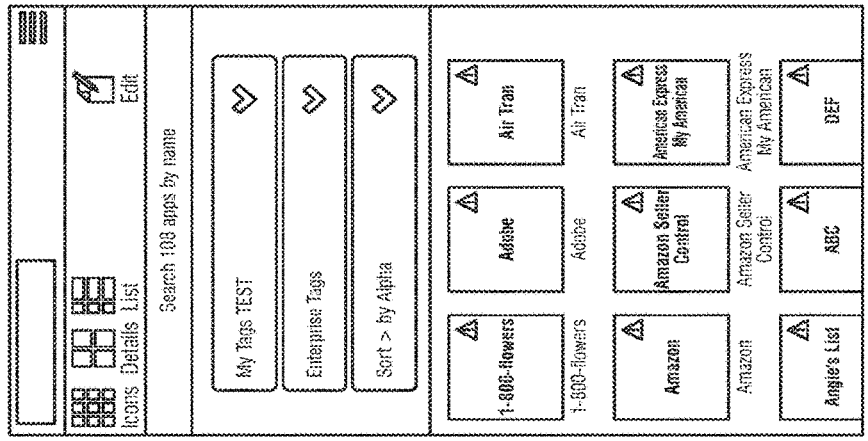
FIG. 14 illustrates an example of a user interface showing icons representing web applications which were added to the system and from which the user can launch with just one click, according to an embodiment.
Figure 13:
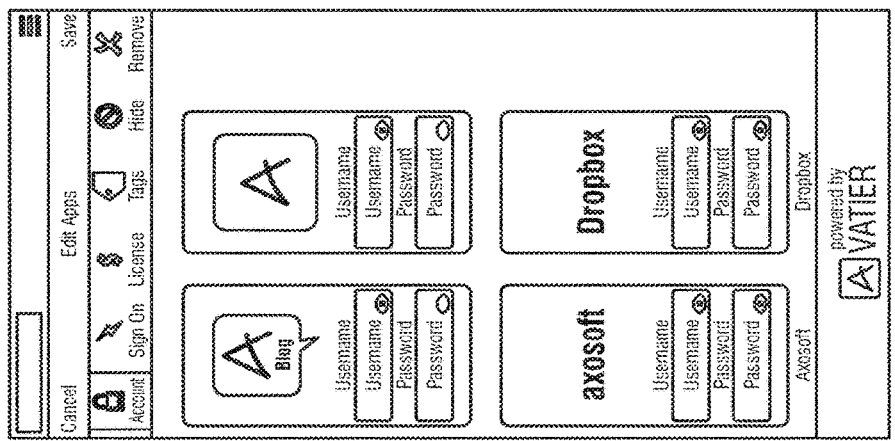
FIG. 13 illustrates an example of a user interface showing four web applications that a user can configure to add to his aggregator system, according to an embodiment.

A smartphone or tablet paradigm or environment illustrates how the innovation solves the technical problem of using computer network resources and bandwidth efficiently by streamlining user interactions with the network. FIG. 11 illustrates an example of a user interface showing a home page of the aggregator system. FIG. 12 illustrates an example of two different devices, a tablet and a smartphone, each displaying the home page web page of the aggregator system. FIG. 13 illustrates an example of a user interface showing four web applications that a user can configure to add to his aggregator system. FIG. 14 illustrates an example of a user interface showing icons representing web applications which were added to the system and from which the user can launch with just one click.

For any new device and in particular for the devices shown, the innovation streamlines user interactions with network, because the user does not need to download and reenter a user ID and password for each of the user's applications. With the technique introduced herein, the user can launch any application already registered in the aggregator platform with a single click, for instance as shown in FIG. 14.

A further efficiency, among others, is afforded the technique introduced here by enabling a user from any device the ability to login with one click to the aggregator system, e.g. as shown in FIG. 11.

A further efficiency is afforded the technique by allowing the user, in addition to launching with one click to a designated application, to add and configure a new application to his already registered applications, as shown in FIGS. 12 and 13.

An Example Machine Overview

Figure 15:
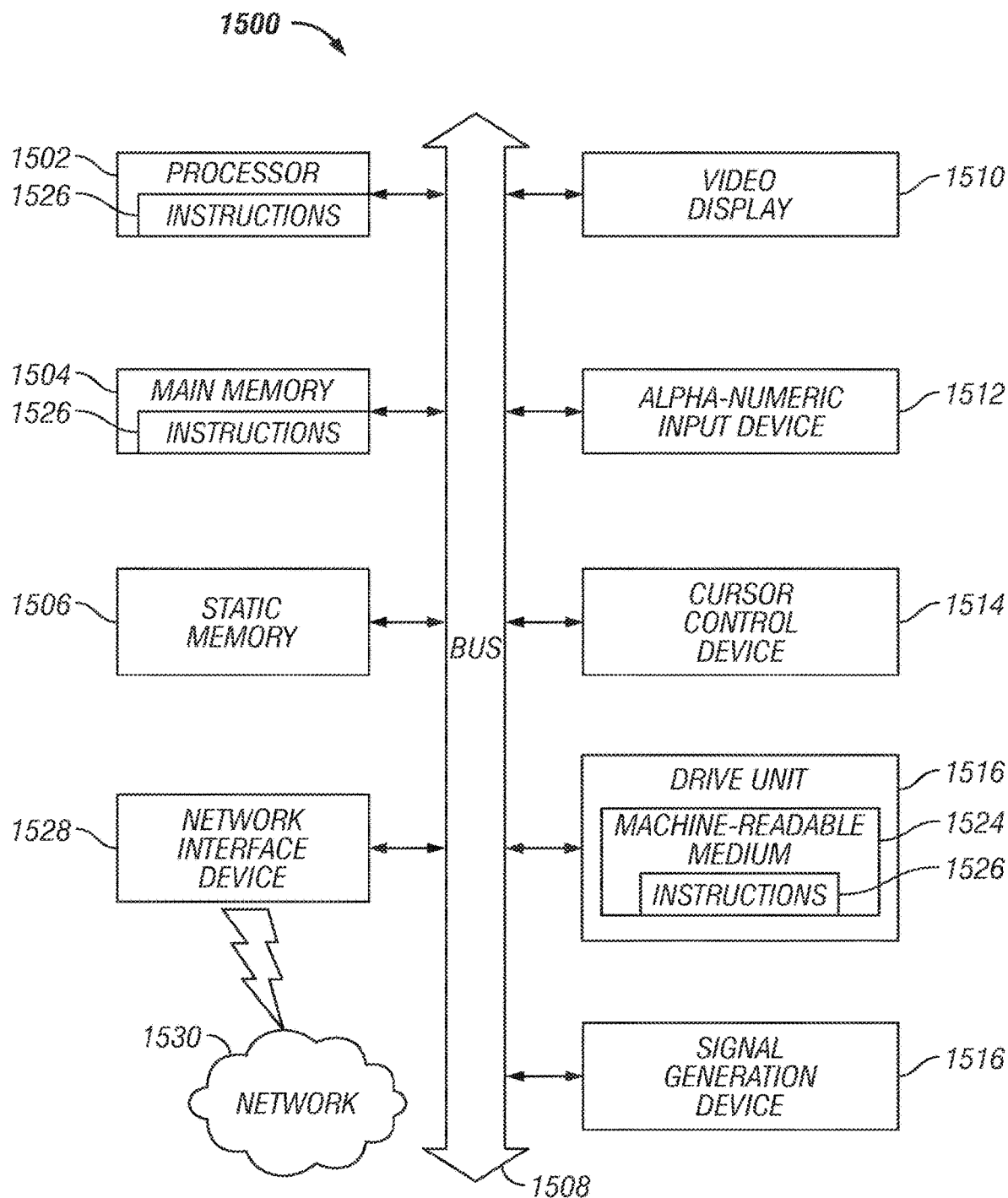
FIG. 15 is a block schematic diagram of a system in the exemplary form of a computer system according to an embodiment.

FIG. 15 is a block schematic diagram of a machine in the exemplary form of a computer system 1500 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 1500 includes a processor 1502, a main memory 1504 and a static memory 1506, which communicate with each other via a bus 1508. The computer system 1500 may further include a display unit 1510, for example, a liquid crystal display (LCD) or a cathode ray tube (CRT). The computer system 1500 also includes an alphanumeric input device 1512, for example, a keyboard; a cursor control device 1514, for example, a mouse; a disk drive unit 1516, a signal generation device 1518, for example, a speaker, and a network interface device 1528.

The disk drive unit 1516 includes a machine-readable medium 1524 on which is stored a set of executable instructions, i.e. software, 1526 embodying any one, or all, of the methodologies described herein below. The software 1526 is also shown to reside, completely or at least partially, within the main memory 1504 and/or within the processor 1502. The software 1526 may further be transmitted or received over a network 1530 by means of a network interface device 1528.

In contrast to the system 1500 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing computations with cloud computing. For the purposes of discussion herein, cloud computing may mean executing algorithms on any network that is accessible by internet-enabled devices, servers, or clients and that do not require complex hardware configurations, e.g. requiring cables, and complex software configurations, e.g. requiring a consultant to install. For example, embodiments may provide one or more cloud computing solutions that enable users, e.g. users on the go, to login to sSSO web applications using social network identity providers or share sSSO web applications anywhere on such internet-enabled devices, servers, or clients. It further should be appreciated that one or more cloud computing embodiments include allowing a user to login to sSSO web applications using social network identity providers or share sSSO web applications using mobile devices, tablets, and the like, as such devices are becoming standard consumer devices.

An Exemplary Method and Apparatus for a Social Network Score

In an embodiment, everyone in the world gets a social network score (SNS). Such SNS can be used for job applications and by the social networks, themselves, for example. In an embodiment, such social network scores are shared by a social network score generating server to companies or other such entities to use. In an embodiment, an individual having a particular social network score can clean-up or increase their score, based on a variety of motivators. The score provides a digital illustration of how some individuals are more active than others or are less active than others. For example, if a person with an account on a social network site does not post often, then that person's score reflects such minimal activity, e.g., being at 100 (related to 1000 being high and reflecting much activity). In an embodiment, an individual's activity on a social network site changes the person's social network score.

In an embodiment, the SNS for an entity reflects how visible the entity is on the social network sites. Visibility can mean a number of accounts that the entity has opened on social network sites. Visibility can mean that the entity is mentioned in other entities' posts, the number of times within a time interval being counted by the innovation and measured against a visibility threshold to determine that the entity is visible or is not visible.

Given an acceptable standard as to the meaning of an SNS, rules engines across a variety of companies in a variety of industries can use the SNS to define critical decisions. For example, an automated job hiring program executing to determine whether a particular entity can proceed to a next step, calls out to an SNS provisioning system with data reflective of the particular entity. The SNS provisioning system returns with the SNS for that particular entity. A rules engine of the automated job hiring program computes a parameter value based on the SNS and determines whether to proceed or terminate the process, based on the parameter value.

Figure 16:
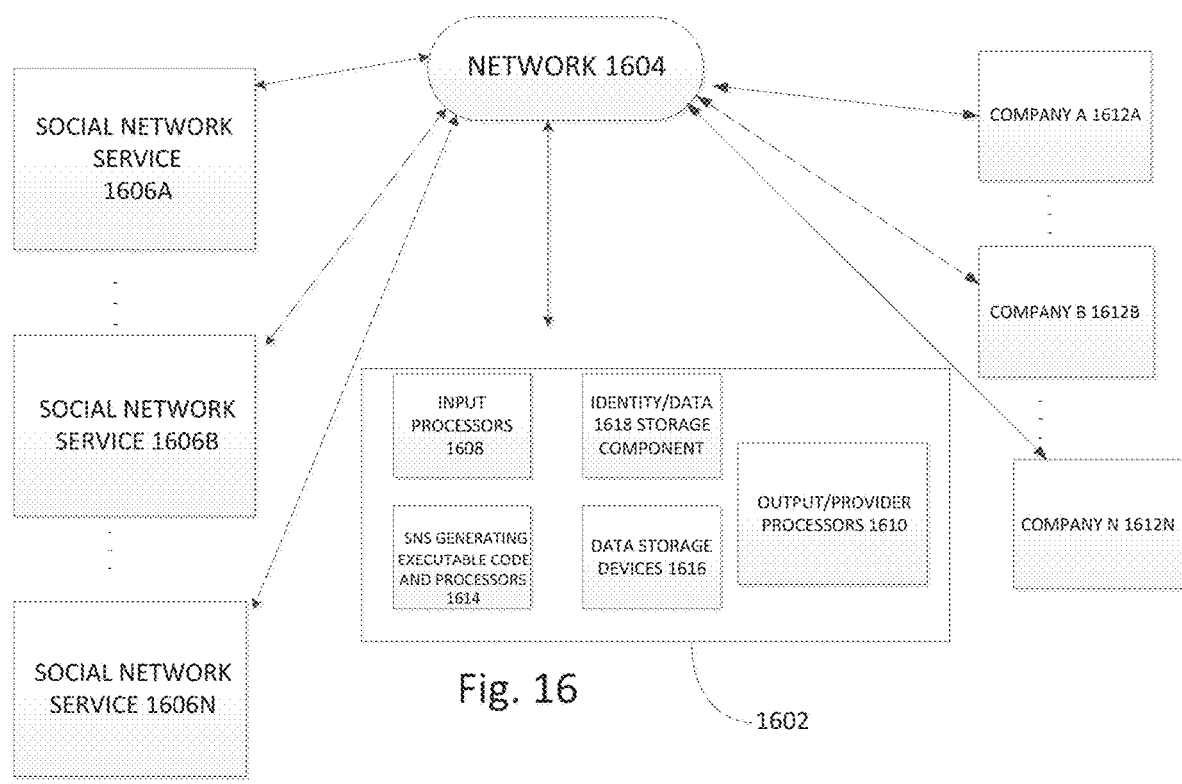
FIG. 16 is a schematic diagram of an exemplary system architecture, according to an embodiment.

An embodiment of the system architecture can be understood with reference to FIG. 16. Company A 1612A (Company B 1612B, . . . , Company N 1612N) is communicatively connected to an Social Network Score (SNS) providing computer 1602 via a network 1604. Also, social network service 1606A (social network service 1606B, . . . , social network service 1606N) is communicatively connected to SNS 1602. SNS 1602 comprises input processors 1608, each of which is configured to receive input from Company A 1612A or social network service 1606A. It should be appreciated that only Company A 1612A and not Company B 1612B through Company N 1612N is discussed for understandable purposes only but is not meant to be limiting. Similarly, social network service 1606A and not social network service 1606B through social network service 1606N is discussed for understandable purposes only but is not meant to be limiting. SNS 1602 also comprises output processors 1610 for sending messages to either Company A 1612A or social network service 1606A. For example, output processors 1610 can send an SNS computed by SNS 1602 to Company A 1612A. SNS 1602 also comprises data storage devices 1616. Such data storage devices 1616 can be configured to store raw data received from input processors 1608. Also, data storage devices 1616 can be configured to store intermediate results generated by component SNS generating executable code and processors 1614. For example, data storage devices 1616 can store the results from 1702, 1704, 1706, or 1708 of FIG. 17 described herein. In an embodiment, SNS generating executable code and processors 1614 is configurable to perform computations related to the SNS. SNS 1602 also comprises an identity data storage component 1618. Identity data storage component 1618 can be a subsystem which stores data reflective of the identities of a plurality of entities. For example, identity data storage component 1618 stores attributes related to an entity, such as but not limited to a user's location, a user's fingerprint or other biometric data, financial information of the user, or health-related information of the user. In an embodiment, identity data storage component 1618 is a communications component which communicates with an external identity provider system such as for example that of co-pending, parent U.S. patent application Ser. No. 15/626,997, filed Jun. 19, 2017, which is incorporated herein in its entirety by this reference thereto.

Examples of such social network sites and applications from which the SNS is based on include but are not limited to online social media and social networking services such as Facebook, Menlo Park, Calif.; online news and social networking service such as Twitter, San Francisco, Calif.; and Instagram (Facebook).

In an embodiment, SNS 1602 is configured to be distributed such that each component can perform optimally and with less bandwidth related issues and obstacles. In an embodiment, any of the components (1608, 1610, 1614, 1616, and 1618) of SNS 1602 are distributed to optimize performance, including decreasing bandwidth related issues and obstacles.

In an exemplary implementation, a job application system can request and obtain a candidate's SNS. It should be appreciated that the SNS can be used in a variety of computer systems such as for example systems that need to monitor and control the amount of traffic going online or to the Internet. As another example, the SNS can be used in a system that monitors system security breaches or cryptographic breaches.

In an embodiment, the SNS can be monetized by the SNS system provider. For example, the SNS system provider can charge a fee for the SNS or can implement an automatic fee structure to control bandwidth access to the SNS provider system.

Figure 17:
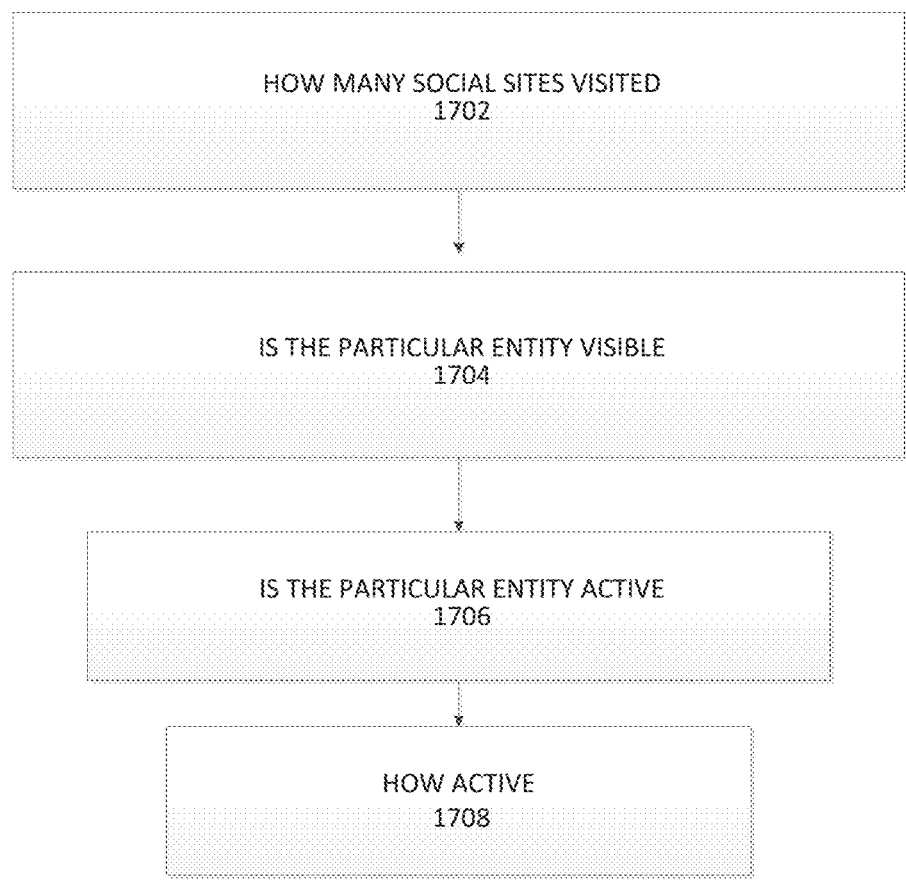
FIG. 17 is a schematic diagram showing at a high level some of the functionality of the innovation, according to an embodiment.

An embodiment can be described with reference to FIG. 17, a flow diagram of an exemplary process of generating a social network score. While the steps are shown in a particular order, it should be appreciated that such steps may occur in any order, in any combination, or in any sub-combination. Also, in an embodiment, the steps of FIG. 17 are carried out in the system shown in FIG. 16.

At 1702, the system requests or gathers information from the various social network sites and applications. The information can be requested or obtained in real-time, in batch, periodically, randomly, or in any mode of pulling information. In an embodiment, the system can be configured such that such information is pushed to the system from the various social network sites and applications. For example, the system can obtain a notification, a message, or a signal indicator, from a particular social network service that a a particular user account accessed the particular social network service from a particular device. In an embodiment, the system accumulates the number of social network sites visited or social network services used and stores such accumulation in either or both volatile and non-volatile memory or data storage devices. The system is configured to compute a total based on the accumulated numbers or part of the accumulated numbers and, optionally, based on time criteria. For example, the system can be configured to determine how many social network sites or services were used by a particular device of a particular user in a particular week's time.

At 1704, the system determines whether a particular entity is visible. For example, the system can access an identity provisioning and storage system to obtain or determine therefrom key words that are associated with identity-related data of the particular entity. For instance, given a particular user entity, the system can access an identity provider to obtain or determine a collection of usernames, nicknames, previous legal names, and the like, associated with the particular user and automatically perform an Internet search, searches on social network sites and services, and the like, to count the number of times such particular user entity appears. The system is configured to eliminate redundancies. From this search, the system is configured to apply a particular sub-score, partial score, or intermediate score to the particular entity based on the number of unique times the user entity appears on online social network sites or services.

At 1706, the system determines whether the particular user entity is active. In an embodiment, the system is user-configured or can be hardcoded to compute an active sub-score, partial score, or intermediate score based on particular criteria including but not limited to a particular instance of time, a particular time interval, a select group of social network sites or services, and the like.

At 1708, the system determines how active the particular user entity is based on criteria, such as currently (at a particular instance of time), during a particular time interval, across a particular select group of social network sites or services, etc. In an embodiment, the system determines and applies a particular sub-score, partial score, or intermediate score to the particular entity based on how active the particular user was determined to be, for examples, based on the number of times the user entity was engaged in the social network sites or services of the select group.

In an embodiment, the system computes the SNS based on any of, any combination of, or all of the computations determined in 1702, 1704, 1706, and 1708. Such SNS can be communicated via the network to any requesting entity, such as a company. For example, Company A may be interested in hiring Person A and needs to perform a search to determine how active Person A is on online social network sites and services. Company A sends an SNS request signal to a centralized SNS providing system for Person A. Company A sends an API with data for particular parameters that are used by the centralized SNS providing system to look up Person A in its identity data storage. In an embodiment, the identity data storage can be external to the centralized SNS providing system, in which case the centralized SNS providing system communicates via a network. The centralized SNS providing system receives or determines searchable key words and phrases that identity that user entity from the identity data storage and automatically performs searches on the Internet, on particular social network sites and services, and the like. The SNS providing system communicates, based on its automated searches, computes the intermediate scores as in 1702, 1704, 1706, and 1708 and communicates such scores, a derived total score, and the like, to Company A. From such intermediate scores or such derived total score, Company A can determine whether Person A is hirable. For instance, a hiring program of Company A is configured to automatically send a request signal to the centralized SNS providing system for Person A, automatically receive results data in a message from the centralized SNS providing system, and, based on comparing the data received for Person A to a configured hierarchy of scores, automatically accepts or declines Person A.

In an embodiment, SNS scores are data structures that are sharable by or across companies.

In an embodiment, an SNS score is configured to change based on an increase or decrease of any of the criteria in 1702, 1704, 1706, and 1708. In an embodiment, the range of SNS scores is modifiable and configurable.

An Exemplary Embodiment of a Social Network Score Method

In an embodiment, a computer-implemented method (or alternatively, a system or non-transitory computer-readable medium) is provided, the method comprising: requesting or gathering, by a social network server, information from a plurality of social network sites, the information in relation to an entity; accumulating, by the social network server, a number of social network sites visited or social network services used by the entity and storing the accumulation number in a data storage; computing, by the social network server, a total based on the accumulated number or part of the accumulated number and based on time criteria; determining, by the social network server, a value of a visibility metric corresponding to the entity based on the total and a predetermined set of visibility rules, where the visibility metric reflects a predetermined definition of how visible the entity is on the plurality of social network sites; determining, by the social network server, a value of an active metric corresponding to the entity based on the total and a predetermined set of active rules, where the active metric reflects a predetermined definition of how many times the entity posts on the plurality of social network sites; computing, by the social network server, a social network score based on the accumulation total, the visibility metric, and the active metric and predetermined social network score rules; and transmitting, by the social network server, the social network score for delivery to a requesting entity, causing the requesting entity to present the social network score along with predetermined information content based on the social network score and a set of rules associated with the requesting entity; wherein one or more steps are performed on at least a processor coupled to at least a memory.

The exemplary method can further comprise wherein the social network score indicates that the entity should increase or decrease its participation on the plurality of social network sites. The exemplary method can further comprise analyzing, by the social network score, the information from the plurality of social network sites and determining therefrom a content metric, where analyzing comprises parsing the content and matching against key words from or evaluating unstructured text against a data storage of terminology and phrases assigned to a predetermined hierarchy that depicts a value of the information, and determining the content metric is based on the value of the information, and wherein computing the social network score is also based on the content metric. The exemplary method can further comprise wherein some sites of the plurality of social network sites are previously configured to push the requested or gathered information to the social network server, wherein the social network server is configured to obtain the pushed information. The exemplary method can further comprise receiving, by the social network server, a notification, a message, or a signal indicator, from one of the plurality of social network sites indicating that a particular user account corresponding to the entity accessed the one of the plurality of social network sites. The exemplary method can further comprise wherein determining the value of the visibility metric further comprises accessing, by the social network server, an identity provisioning and storage system to obtain or determine therefrom key words that are associated with identity-related data of the entity and automatically subsequently performing an Internet search including searching social network sites and services to count the number of times the entity is mentioned or posted posts. The exemplary method can further comprise wherein determining the value of the visibility metric further comprises: accessing, by the social network server, an identity provisioning and storage system to obtain or determine therefrom a collection of usernames, nicknames, previous legal names, and the like, associated with the entity, automatically subsequently performing an Internet search and searches on social network sites and services, automatically counting a number of times the entity appears or posts, and subsequently automatically computing the visibility metric based on the number of unique times the entity appears on online social network sites or services. The exemplary method can further comprise wherein the social network score is sharable by or across one or more external companies. The exemplary method can further comprise wherein the social network score is configured to change based on an increase or decrease of any of the criteria in the accumulation total, visibility metric, the active metric, and the content metric.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method, comprising:
requesting or gathering, by a social network server, information from a plurality of social network sites, the information in relation to an entity, wherein an entity is a social network user and wherein the plurality of social network sites comprises two or more social network sites;
accumulating, by the social network server, a number of social network sites visited or social network services used by the entity and storing the accumulation number in a data storage;
computing, by the social network server, a total based on the accumulated number or part of the accumulated number and based on time criteria;
determining, by the social network server, a value of a visibility metric corresponding to the entity based on the total and a predetermined set of visibility rules, where the visibility metric reflects a predetermined definition of how visible the entity is on the plurality of social network sites;
determining, by the social network server, a value of an active metric corresponding to the entity based on the total and a predetermined set of active rules, where the active metric reflects a predetermined definition of how many times the entity posts on the plurality of social network sites;
computing, by the social network server, a social network score based on the accumulation total, the visibility metric, and the active metric and predetermined social network score rules; and
transmitting, by the social network server, the social network score for delivery to a requesting entity, causing the requesting entity to present the social network score along with predetermined information content based on the social network score and a set of rules associated with the requesting entity;
wherein one or more steps are performed on at least a processor coupled to at least a memory.

2. The method of claim 1, wherein the social network score indicates that the entity should increase or decrease its participation on the plurality of social network sites.

3. The method of claim 1, further comprising:
analyzing, by the social network score, the information from the plurality of social network sites and determining therefrom a content metric, where analyzing comprises parsing the content and matching against key words from or evaluating unstructured text against a data storage of terminology and phrases assigned to a predetermined hierarchy that depicts a value of the information, and determining the content metric is based on the value of the information, and wherein computing the social network score is also based on the content metric.

4. The method of claim 1, wherein some sites of the plurality of social network sites are previously configured to push the requested or gathered information to the social network server, wherein the social network server is configured to obtain the pushed information.

5. The method of claim 1, further comprising:
receiving, by the social network server, a notification, a message, or a signal indicator, from one of the plurality of social network sites indicating that a particular user account corresponding to the entity accessed the one of the plurality of social network sites.

6. The method of claim 1, wherein determining the value of the visibility metric further comprises:
accessing, by the social network server, an identity provisioning and storage system to obtain or determine therefrom key words that are associated with identity-related data of the entity and automatically subsequently performing an Internet search including searching social network sites and services to count the number of times the entity is mentioned or posted posts.

7. The method of claim 1, wherein determining the value of the visibility metric further comprises:
accessing, by the social network server, an identity provisioning and storage system to obtain or determine therefrom a collection of usernames, nicknames, or previous legal names associated with the entity, automatically subsequently performing an Internet search and searches on social network sites and services, automatically counting a number of times the entity appears or posts, and subsequently automatically computing the visibility metric based on the number of unique times the entity appears on online social network sites or services.

8. The method of claim 1, wherein the social network score is sharable by or across one or more external companies.

9. The method of claim 1, wherein the social network score is configured to change based on an increase or decrease of any of the criteria in the accumulation total, visibility metric, the active metric, and the content metric.

10. An apparatus, comprising:
a requesting or gathering processor configured to request or gather, by a social network server, information from a plurality of social network sites, the information in relation to an entity, wherein an entity is a social network user and wherein the plurality of social network sites comprises two or more social network sites;
an accumulating processor configured to accumulate, by a social network server, a number of social network sites visited or social network services used by the entity and store the accumulation number in a data storage;
a first computing processor configured to compute, by the social network server, a total based on the accumulated number or part of the accumulated number and based on time criteria;
a first determining processor configured to determine, by the social network server, a value of a visibility metric corresponding to the entity based on the total and a predetermined set of visibility rules, where the visibility metric reflects a predetermined definition of how visible the entity is on the plurality of social network sites;
a second determining processor configured to determine, by the social network server, a value of an active metric corresponding to the entity based on the total and a predetermined set of active rules, where the active metric reflects a predetermined definition of how many times the entity posts on the plurality of social network sites;
a second computing processor configured to compute, by the social network server, a social network score based on the accumulation total, the visibility metric, and the active metric and predetermined social network score rules;
a transmitting processor configured to transmit, by the social network server, the social network score for delivery to a requesting entity, causing the requesting entity to present the social network score along with predetermined information content based on the social network score and a set of rules associated with the requesting entity; and
at least one memory operable to store computer program instructions executable by said at least one of said processors.

11. The apparatus of claim 10, wherein the social network score indicates that the entity should increase or decrease its participation on the plurality of social network sites.

12. The apparatus of claim 10, further comprising:
an analyzing processor configured to analyze, by the social network score, the information from the plurality of social network sites and determine therefrom a content metric, where analyzing comprises parsing the content and matching against key words from or evaluating unstructured text against a data storage of terminology and phrases assigned to a predetermined hierarchy that depicts a value of the information, and determine the content metric is based on the value of the information, and wherein computing the social network score is also based on the content metric.

13. The apparatus of claim 10, wherein some sites of the plurality of social network sites are previously configured to push the requested or gathered information to the social network server, wherein the social network server is configured to obtain the pushed information.

14. The apparatus of claim 10, further comprising:
a receiving processor configured to receive, by the social network server, a notification, a message, or a signal indicator, from one of the plurality of social network sites indicating that a particular user account corresponding to the entity accessed the one of the plurality of social network sites.

15. The apparatus of claim 10, wherein for determining the value of the visibility metric, the apparatus further comprises:
an accessing processor configured to access, by the social network server, an identity provisioning and storage system to obtain or determine therefrom key words that are associated with identity-related data of the entity and automatically subsequently perform an Internet search including search social network sites and services to count the number of times the entity is mentioned or posted posts.

16. The apparatus of claim 10, wherein for determining the value of the visibility metric, the apparatus further comprises:
an accessing processor configured to access, by the social network server, an identity provisioning and storage system to obtain or determine therefrom a collection of usernames, nicknames, or previous legal names associated with the entity, automatically subsequently performing an Internet search and searches on social network sites and services, automatically counting a number of times the entity appears or posts, and subsequently automatically computing the visibility metric based on the number of unique times the entity appears on online social network sites or services.

17. The apparatus of claim 10, wherein the social network score is sharable by or across one or more external companies.

18. The apparatus of claim 10, wherein the social network score is configured to change based on an increase or decrease of any of the criteria in the accumulation total, visibility metric, the active metric, and the content metric.

19. A non-transitory computer readable medium having stored thereon a computer program, said computer program comprising a program code which, when executed by a processor, performs the steps of:
a requesting or gathering processor configured to request or gather, by a social network server, information from a plurality of social network sites, the information in relation to an entity, wherein an entity is a social network user and wherein the plurality of social network sites comprises two or more social network sites;
accumulating, by the social network server, a number of social network sites visited or social network services used by the entity and storing the accumulation number in a data storage;
computing, by the social network server, a total based on the accumulated number or part of the accumulated number and based on time criteria;
determining, by the social network server, a value of a visibility metric corresponding to the entity based on the total and a predetermined set of visibility rules, where the visibility metric reflects a predetermined definition of how visible the entity is on the plurality of social network sites;
determining, by the social network server, a value of an active metric corresponding to the entity based on the total and a predetermined set of active rules, where the active metric reflects a predetermined definition of how many times the entity posts on the plurality of social network sites;
computing, by the social network server, a social network score based on the accumulation total, the visibility metric, and the active metric and predetermined social network score rules; and
transmitting, by the social network server, the social network score for delivery to a requesting entity, causing the requesting entity to present the social network score along with predetermined information content based on the social network score and a set of rules associated with the requesting entity.

* * * * *